AUTOMATIC APPARATUS FOR OPERATING BUSINESS MACHINES

Filed Oct. 14, 1957 13 Sheets-Sheet 1

INVENTORS
HARRY L. LAMBERT
PAUL F. PAGE
ALTON G. SNYDER
BY Thomas S. Ross
Albert W. Scribner
ATTORNEYS

AUTOMATIC APPARATUS FOR OPERATING BUSINESS MACHINES

Filed Oct. 14, 1957 13 Sheets-Sheet 2

INVENTORS
HARRY L. LAMBERT
PAUL F. PAGE
ALTON G. SNYDER
BY Thomas S. Ross
Albert W. Scribner
ATTORNEYS INVENTORS
HARRY L. LAMBERT
PAUL F. PAGE
ALTON G. SNYDER
BY Thomas S. Ross
Albert W. Scribner
ATTORNEYS

AUTOMATIC APPARATUS FOR OPERATING BUSINESS MACHINES

Filed Oct. 14, 1957

13 Sheets-Sheet 4

INVENTORS
HARRY L. LAMBERT
PAUL F. PAGE
ALTON G. SYNDER

BY Thomas S. Ross
Albert W. Scribner
ATTORNEYS

July 14, 1959 H. L. LAMBERT ET AL 2,894,614

AUTOMATIC APPARATUS FOR OPERATING BUSINESS MACHINES

Filed Oct. 14, 1957 13 Sheets-Sheet 5

INVENTORS
HARRY L. LAMBERT
PAUL F. PAGE
ALTON G. SNYDER

BY Thomas S. Ross
Albert W. Scribner
ATTORNEYS

AUTOMATIC APPARATUS FOR OPERATING BUSINESS MACHINES

INVENTORS
HARRY L. LAMBERT
PAUL F. PAGE
ALTON G. SNYDER
BY Thomas S. Ross
Albert W. Scribner
ATTORNEYS

AUTOMATIC APPARATUS FOR OPERATING BUSINESS MACHINES

INVENTORS
HARRY L. LAMBERT
PAUL F. PAGE
ALTON G. SNYDER
BY Thomas S. Ross
Albert W. Scribner
ATTORNEYS

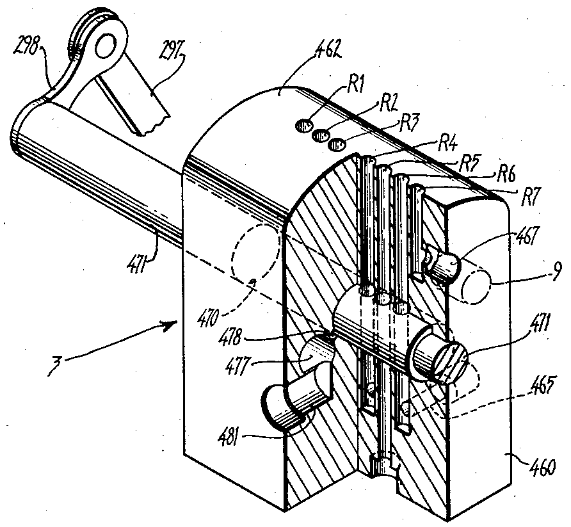
Fig. 26
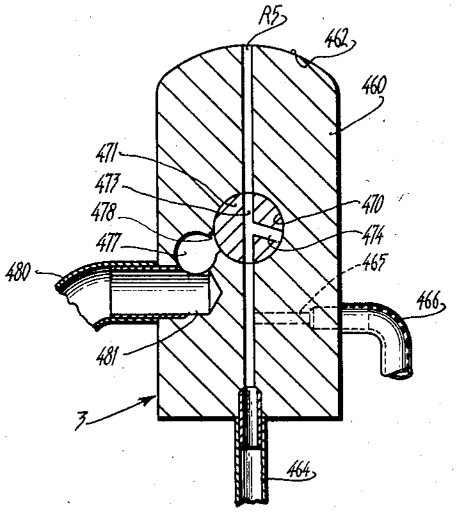
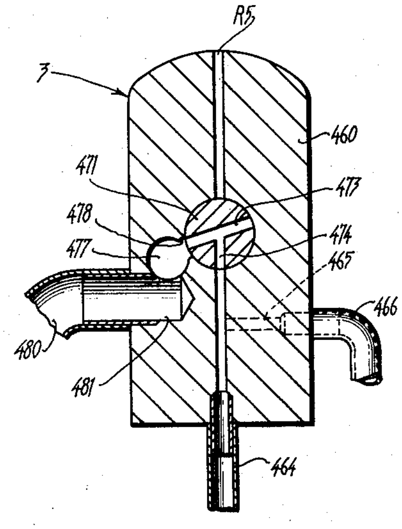
Fig. 27 Fig. 28
INVENTORS
HARRY L. LAMBERT
PAUL F. PAGE
ALTON G. SNYDER
BY Thomas S. Ross
Albert W. Scribner
ATTORNEYS July 14, 1959 H. L. LAMBERT ET AL 2,894,614

AUTOMATIC APPARATUS FOR OPERATING BUSINESS MACHINES

Filed Oct. 14, 1957 13 Sheets-Sheet 9

INVENTORS
HARRY L. LAMBERT
PAUL F. PAGE
ALTON G. SNYDER
BY Thomas S. Ross
Albert W. Scribner
ATTORNEYS INVENTORS
HARRY L. LAMBERT
PAUL F. PAGE
ALTON G. SNYDER
BY Thomas S. Ross
Albert W. Scribner
ATTORNEYS July 14, 1959 H. L. LAMBERT ET AL 2,894,614

AUTOMATIC APPARATUS FOR OPERATING BUSINESS MACHINES

Filed Oct. 14, 1957 13 Sheets-Sheet 11

INVENTORS
HARRY L. LAMBERT
PAUL F. PAGE
ALTON G. SNYDER
BY Thomas S. Ross
Albert W. Scribner
ATTORNEYS July 14, 1959 H. L. LAMBERT ET AL 2,894,614

AUTOMATIC APPARATUS FOR OPERATING BUSINESS MACHINES

Filed Oct. 14, 1957 13 Sheets-Sheet 12

INVENTORS
HARRY L. LAMBERT
PAUL F. PAGE
ALTON G. SNYDER

BY

ATTORNEYS

INVENTORS
HARRY L. LAMBERT
PAUL F. PAGE
ALTON G. SNYDER
BY Thomas S. Ross
Albert W. Scribner
ATTORNEYS 2,894,614
Patented July 14, 1959

2,894,614

AUTOMATIC APPARATUS FOR OPERATING BUSINESS MACHINES

Harry L. Lambert, West Hartford, and Paul F. Page and Alton G. Snyder, Newington, Conn., assignors to Royal McBee Corporation, Port Chester, N.Y., a corporation of New York Application October 14, 1957, Serial No. 690,099

31 Claims. (Cl. 197—20)

This invention relates to an automatic apparatus for operating business machines and more particularly relates to a pneumatic means for automatically actuating a typewriter, or the like, in response to a plurality of coded pressure impulses which are initiated by a perforated record reader.

The prior art devices, as exemplified by that shown in U.S. Patents 2,198,860 and 2,377,323, for pneumatically operating a typewriter and like machines, employ a relatively large size "music roll" type of record having a large number of individually operative holes punched therein. When such records are passed over a reading head or "tracker bar" the individual holes punched in said record each normally controls a separate pneumatic circuit that operates one of the respective key levers or other control linkages of the typewriter. In such an arrangement the record must be made wide enough to accommodate 40 or 50 longitudinal columns of punched holes, i.e. each longitudinal succession of holes controls the operation of only one key of the typewriter. Further the "tracker bar" of the record reader must be provided with at least an equal number of ports for pneumatically sensing the presence or absence of the holes in each of said columns. In that each of these ports is separately connected to one of the various actuators for the respective typewriter type bars, it will be readily seen that a large number of individual pneumatic conduits, valves, junctions and related apparatus is required to constitute a complete and operative typewriter control and actuating device. Under these conditions not only does the large size record and the excessive number of duplicate pneumatic circuits increase the initial, operating and maintenance costs of the apparatus but the size and number of the component parts thereof may adversely affect the speed at which the system may operate. Furthermore the punching of the holes in large sized music roll type of records is a time consuming operation and the space requirements for storage of such perforated records may become critical if a large number of separate units thereof must be maintained for current use. Another disadvantage of the "music roll" type of record is that the record reading mechanism and the related apparatus is not compatible with coded types of perforated records, such as tapes and cards, which are now commonly used in data processing equipment.

One object of the invention is to provide an improved record reading apparatus which is capable of pneumatically reading a record having a plurality of holes punched therein.

Another object of the invention is to provide a pneumatically operated record reading apparatus which is compatible with other data processing units using standard communication code.

Another object of the invention is to provide a pneumatic record reading apparatus wherein the record sensing operation is effected in timed relation to the intermittent feed motion of said record.

Another object of the invention is to provide a pneumatic decoding means for initiating a succession of individual pressure impulses in response to the successive operation of a perforated record sensing means.

Another object of the invention is to provide an improved pneumatically operated record reading apparatus having interrelated mechanisms for operating the carriage control linkages of an electric typewriter and for operating the record feed drive means.

Another object of the invention is to provide novel pneumatic circuitry for decoding a plurality of pressure impulses which are inter-related in accordance with communication code.

Another object of the invention is to provide an improved pneumatic record reading apparatus having inter-related controls for the record feed drive means and the means for pneumatically conditioning the record sensing head.

Another object of the invention is to provide a novel record transport for the instant apparatus.

Other objects of the invention will become apparent as the disclosure progresses.

In the drawings:

Fig. 26 is a perspective view in partial section showing the construction of the pneumatic record reading head of the instant apparatus.

Figs. 27 and 28 are vertical cross sectional views of the reading head of Fig. 26, and show the valve stem of said head in two operative positions.

Figure 36:
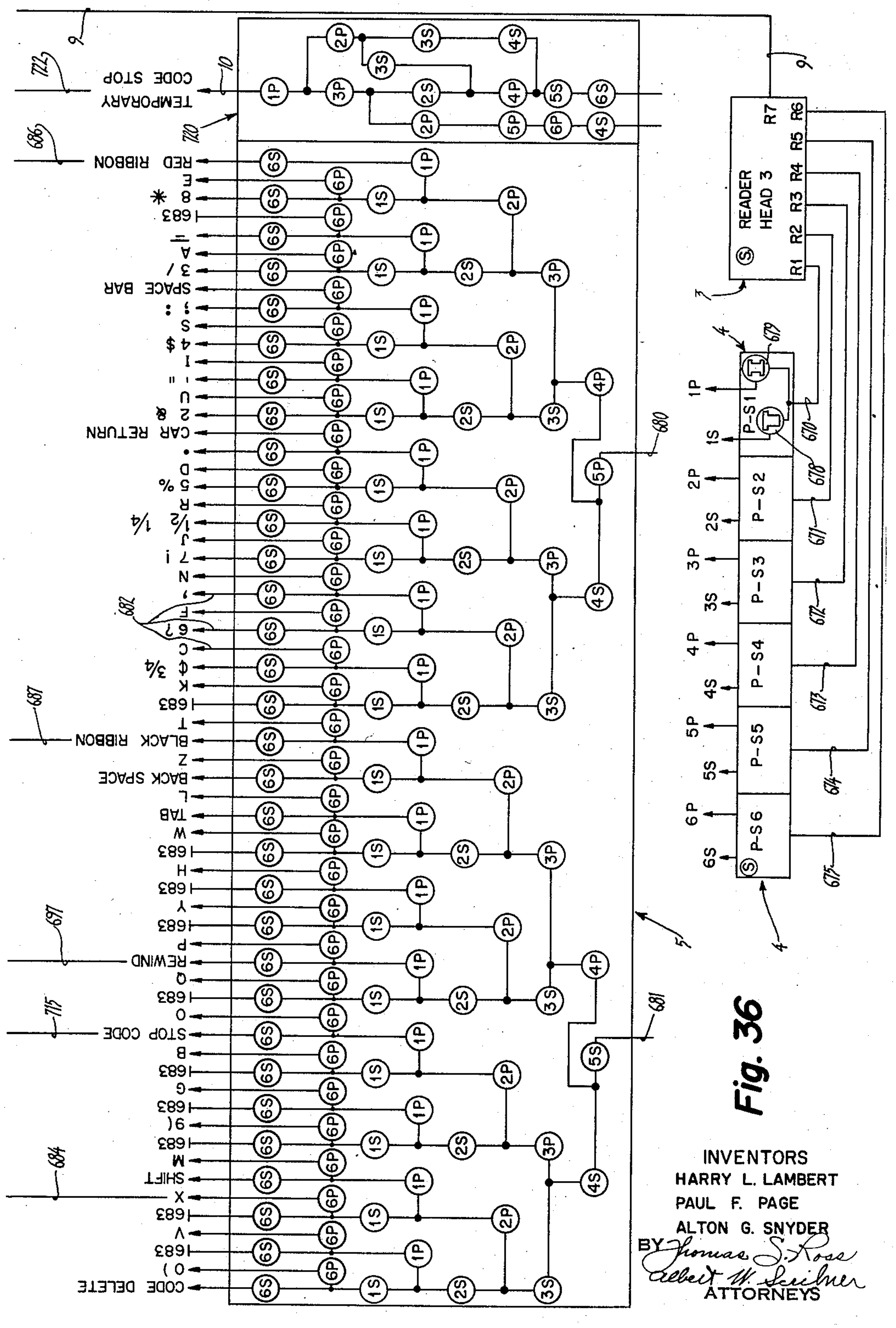
Figure 37:
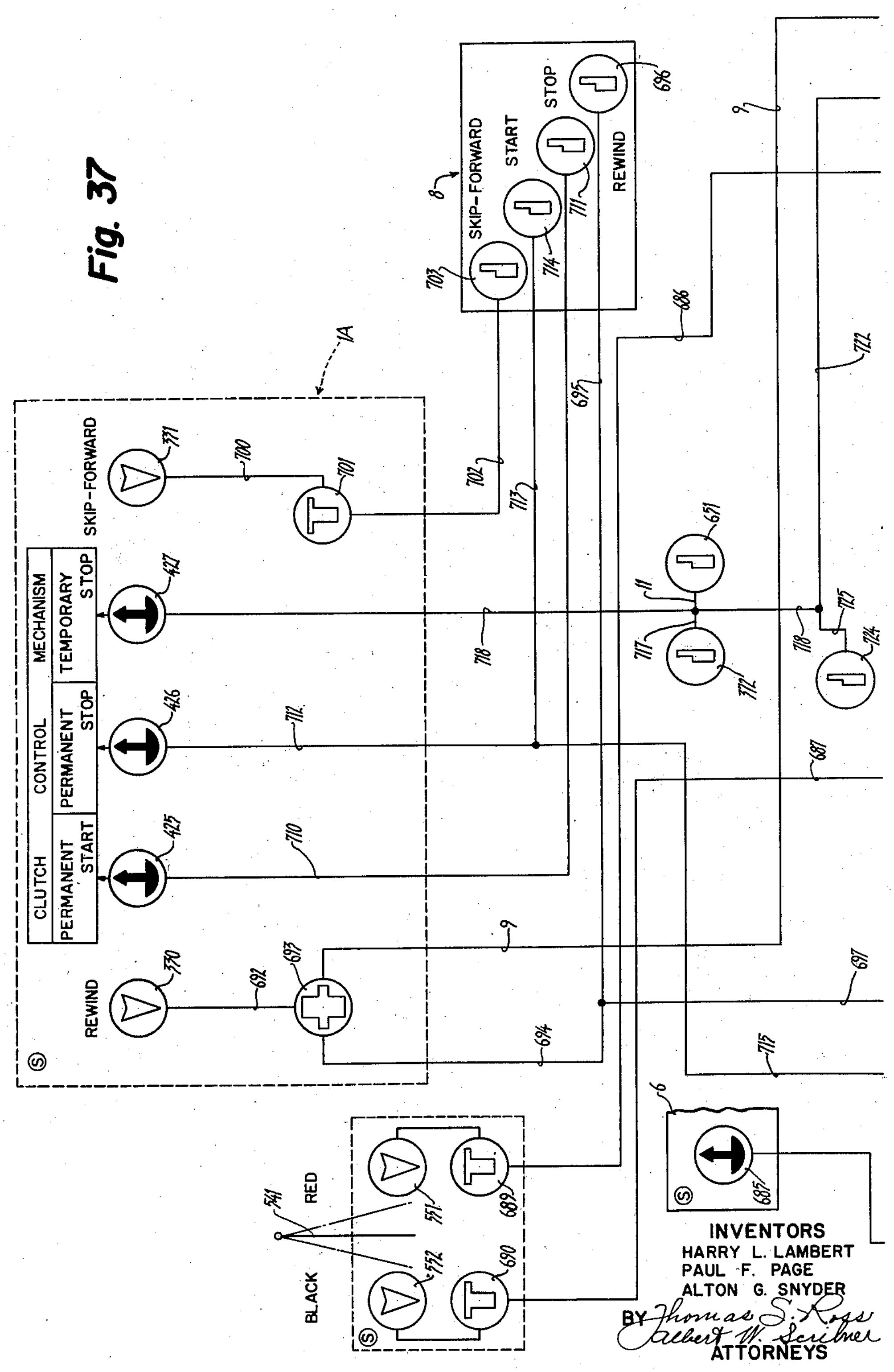

Figs. 36 and 37 collectively define the pneumatic circuit diagram for the instant apparatus.

Although the instant apparatus will be described and claimed as employing a punched tape it will be understood that various other types of perforated records may be used in conjunction with said apparatus.

A general description of the nature and operation of the instant apparatus will be made with reference to the block diagram in Fig. 1. Here the record feed mechanism 1 moves the punched tape 2 over the reading or sensing head 3. Said head initiates successive groups of coded pneumatic pressure impulses, each group of which corresponds to the number and distribution of the holes in each of the successive transverse rows of holes in said tape. These coded pressure impulses control the operation of a primary-secondary valve assembly 4 which initiates a plurality of pairs of pressure impulses; each of said pairs corresponding to one of the respective impulses initiated by said reading unit 3. The decoding valve assembly 5 serves to decode the pressure impulses received from said valve assembly 4 and to control the operation of the pneumatic actuator mechanism 6. Said actuator mechanism 6 is adapted to selectively operate the various control linkages of a conventional type electric typewriter 7. The operation of the record feed mechanism 1 is adapted to be controlled by several manually operable elements of the control panel 8, and through the feed back control lines 9, 10, and/or 11 from the reading head 3, the decoding valve assembly 5 and the typewriter 7 respectively.

Referring to Figs. 2–8 the various pneumatic valves utilized in connection with this invention will be seen. In order to fully understand the operation of the instant apparatus it is necessary to be thoroughly versed in the operation of these various valves and, therefore, this description will first be directed to their respective natures and functions.

Figure 2:
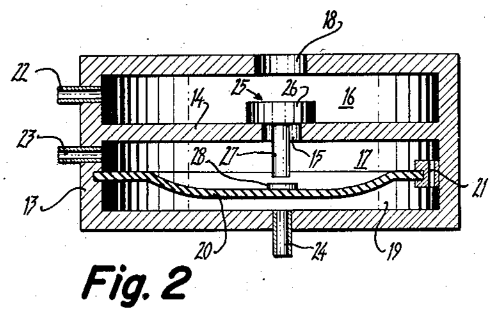
Figs. 2–8 are sectional views showing the general nature and operation of the various pneumatic valves used in connection with the hereinafter described apparatus.

The valve illustrated somewhat diagrammatically in Fig. 2 is of the type which will hereinafter be referred to as a secondary valve. Describing first the general structural characteristics of this valve there is provided a valve body 13 having an internal partition wall 14 that is formed with an aperture 15 which pneumatically interconnects the upper chamber 16 with the intermediate chamber 17. The uppermost wall of the body 13 is provided with an aperature 18. A lower chamber 19 is provided in the body 13 by securing the periphery of the flexible diaphragm 20 to the vertical walls of said body. A restricted bleed passage 21 is provided in order to pneumatically interconnect said intermediate and lower chambers 17 and 19. Pressure conduit lines 22, 23 and 24 respectively communicate with the chambers 16, 17 and 19. A movable valve member 25, having head and stem portions 26 and 27 respectively, is adapted to cooperate with the apertures 15 and 18 in a manner which is described below. The contact pad 28 secured to upper side of the flexible diaphragm 20 is adapted to engage the lower end of said stem 27 and lift said valve member 25 when diaphragm 20 is flexed upwardly.

In operation the secondary valve of Fig. 2 is connected to a sub-atmospheric pressure source through the line 23 whereby a reduced pressure will normally exist in the pneumatically interconnected chambers 17 and 19. Chamber 16 will be open to the atmosphere through aperture 18. Under these normal pressure conditions the head 26 of valve member 25 will be held in engagement with the upper surface of partition wall 14 so that said head will overlie and pneumatically block the aperture 15. Valve member 25 is maintained in this position by reason of the differential pressure existing on either side of said head, the pressure in chamber 17 being sub-atmospheric and the pressure in chamber 16 being atmospheric. It will be apparent that the pressure in the valve control line 24 is normally sub-atmospheric.

The valve is operated by initiating an atmospheric pressure impulse in the control line 24. This impulse will increase the pneumatic pressure existing below the diaphragm 20 and before the pressure in chamber 17 is increased by air flow through the restricted bleed passage 21 the pressure differential acting on the opposite sides of said diaphragm will cause the latter to be flexed upwardly thereby lifting and holding the valve member 25 in an elevated position wherein said head 26 overlies and pneumatically blocks the aperture 18. In this actuated condition of the valve, chamber 16 will be pneumatically connected through aperture 15 to said sub-atmospheric pressure source acting through line 23 whereby a sub-atmospheric pressure impulse will be initiated in the valve output line 22.

When the atmospheric pressure impulse in the control line 24 is terminated the pressure in chambers 17 and 19 and in the line 24 will be restored to the normally sub-atmospheric level by the action of said source. When this occurs the valve member 25 and diaphragm 20 will be moved downwardly under the action of the pressure differential existing on the upper and lower surfaces of head 26 of valve member 25. The pressure in chamber 16 thus becoming atmospheric, and hence greater than that in chamber 17, will cause said valve member 25 to be seated and held over the aperture 15 as shown in Fig. 2. At the same time the pressure in said output line 22 will be restored to the normal atmospheric level.

It will be understood that the showing in Fig. 2 is for the purpose of illustration only and is not to be taken as setting forth the exact constructional details or dimensions of the secondary valve.

Figure 3:
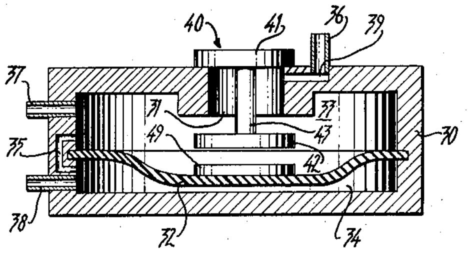

Referring to Fig. 3 there is diagrammatically shown a valve which will be hereinafter referred to as a primary valve. Describing first the structural characteristics of the valve there is provided a valve body 30 having an aperture 31 formed in the upper wall thereof. The interior of said valve body 30 is partitioned by means of a flexible diaphragm 32 thus providing an upper and lower chamber 33 and 34 respectively, said chambers being pneumatically interconnected by means of a restricted bleed passage 35. Three pressure conduit lines 36, 37 and 38 are connected to the primary valve. Line 36 pneumatically communicates with the upper chamber 33 through the passage 39 and said aperture 31, while lines 37 and 38 pneumatically communicate directly with the upper and lower chambers 33 and 39 respectively. A valve member 40 is operatively disposed in the said aperture 31 of the valve body, said member having upper and lower head portions 41 and 42 respectively and an interconnecting stem portion 43. A contact pad 44 is secured to the upper surface of the flexible diaphragm 32 in a position beneath the lower head portion 42 of said valve member.

In operation, the primary valve of Fig. 3 is connected to a sub-atmospheric pressure source through line 37 whereby a reduced pressure will normally exist in said pneumatically interconnected chambers 33 and 34. Under these pressure conditions the atmospheric pressure acting above the upper valve head 41 will retain the valve member 40 in its lower operative position shown in Fig. 3 wherein said head portion 41 overlies and pneumatically blocks the upper end of aperture 31 and wherein the valve output line 36 is pneumatically connected with said upper chamber 33. In that the pressure in said chambers 33 and 34 is normally sub-atmospheric, it will be apparent the pressure in the valve control and output lines 38 and 36 respectively is normally sub-atmospheric.

The valve is operated by initiating an atmospheric pressure impulse in the valve control line 38. This impulse will increase the pressure in chamber 34 and before the pressure in chamber 33 is also increased by air flow through the restricted passage 35 the differential pressure acting on the opposite sides of the diaphragm 32 will cause the latter to be flexed upwardly thereby lifting and holding the valve member 40 in an upper operative position wherein the lower head portion 42 thereof overlies and pneumatically blocks the lower end of said aperture 31. In this actuated condition of the valve the upper end of the aperture 31 will be open to the atmosphere and hence an atmospheric pressure impulse will be initiated in said passage 39 and in the valve output line 36.

When the atmospheric pressure impulse in the control line 38 is terminated the pressure in chambers 33 and 34 will be restored to the normal sub-atmospheric level by the action of said source. When this occurs the valve member 40 and the diaphragm 32 will be moved downwardly from said upper position under the action of the differential pressure existing on the upper and lower sides of said valve head portion 42 and will be thereby restored and held in said normal lower position, as shown in Fig. 3. Thus the valve output line 36 is again pneumatically connected to the chamber 33 and hence the pressure in said output line will be reduced to the normal sub-atmospheric level.

Figure 4:
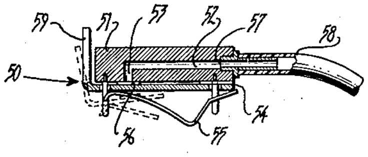

Referring to Fig. 4 there is shown an impulse valve 50 comprising a valve body 51 having a passage 52 formed therethrough. One end 53 of said passage is normally closed by means of the actuating arm 54 the right hand end of which is pivotally mounted by any suitable means to said valve body 51. A leaf spring 55 normally biases said arm in a clockwise direction whereby the piece of leather 56 or similar material secured to the inner side of said arm 54 overlies and pneumatically blocks said end 53 of passage 52. The other end 57 of passage 52 communicates with the sub-atmospheric pressure line 58. It will be apparent that when the free end 59 of said arm 54 is depressed, said arm will be moved to the dotted line position of Fig. 4 to thereby uncover the end 53 of passage 52 and thus cause an atmospheric pressure impulse to be initiated in the said line 58.

Figure 5:
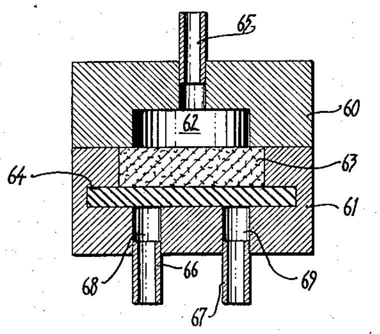

The valve shown in Fig. 5 will hereinafter be referred to as a blocking valve and comprises a pair of recessed valve body portions 60 and 61 which cooperatively define an air chamber 62. Mounted in juxtaposition at the lower end of said chamber is a flexible pad member 63 and a flexible diaphragm 64. Air chamber 62 pneumatically communicates with the control line 65. The valve flow lines 66 and 67 communicate with the apertures 68 and 69 formed in the lower wall of the valve body portion 61. When the pressure in control line 65 and chamber 62 is atmospheric the flexible diaphragm 64 will remain in the position shown in Fig. 5 thereby overlying the respectively inner ends of said apertures 68 and 69 and preventing the pneumatic connection of flow lines 66 and 67. When the pressure in said line 65 and chamber 62 is lowered to a sub-atmospheric level, the diaphragm 64 will be flexed upwardly thereby uncovering the respective inner ends of said apertures and pneumatically interconnecting said flow lines 66 and 67.

Figure 6:
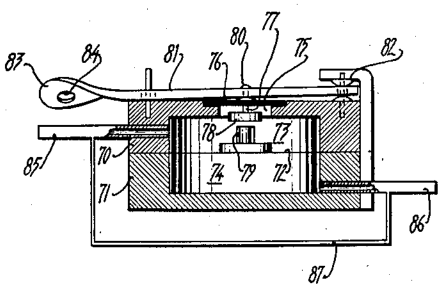

Referring to Fig. 6 there is shown a pouch actuator which is adapted to convert atmospheric pressure impulses into a mechanical movement. The actuator comprises the cooperating recessed upper and lower body portions 70 and 71 which are separated by a flexible diaphragm 72 thereby forming an upper chamber 73 and a lower chamber 74. The aperture 75 formed in the upper body portion 70 is pneumatically sealed by a second diaphragm 76. A contact stem 77 extends through said diaphragm 76 and has at its lower end a head 78 which overlies the contact button 79 secured to said diaphragm 72. The upper end 80 of said stem 77 is secured to the arm 81, the right hand end 82 of which is articulately connected by any suitable means to the said body portion 70. The free end 83 of said arm has an aperture 84 formed therein which is adapted to receive the link or lever which is desired to be actuated. The sealed upper chamber 73 is pneumatically connected to a sub-atmospheric pressure source through the line 85 while the lower chamber 74 is pneumatically connected with the control line 86. Said lines 85 and 86 are pneumatically interconnected by a restricted bleed line 87.

In the normal condition of the actuator the pressure in both of the chambers 73 and 74 is sub-atmospheric. When an atmospheric pressure impulse is initiated in the control line 86 the pressure in the lower chamber 74 will increase more rapidly than in chamber 73; hence the differential pressure acting on said diaphragm 72 will cause said diaphragm 72 to be flexed upwardly thereby engaging and lifting the stem 77 and pivotally actuating the said arm 81. Upon termination of the atmospheric pressure impulse in the control line 86, the chamber 74 will be reevacuated and the diaphragm 72 together with the actuating arm 81 will return to their normal positions shown in Fig. 6.

Figure 7:
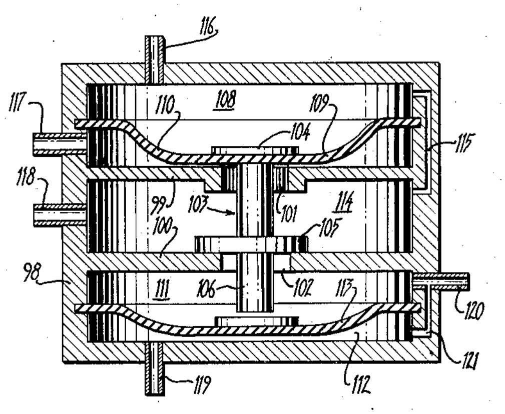

The valve shown in Fig. 7 will be hereinafter referred to as an on-off valve and comprises a valve body 98 having two internal spaced partition walls 99 and 100 each provided with a centrally disposed aperture 101 and 102 respectively. A valve member 103 is operatively disposed in said apertures, said member having a headed upper end 104, a flange portion 105 and a stem portion 106. The space enclosed above the partition wall 99 is divided into two chambers 108 and 109 by means of the flexible diaphragm 110 which is centrally secured to the lower surface of the headed end 104 of valve member 103. The space enclosed below said partition wall 100 is divided into two chambers 111 and 112 by means of the flexible diaphragm 113. The space between the two partition walls 99 and 100 defines a chamber 114. Chambers 108 and 114 are pneumatically interconnected by the restricted bleed passage 115 and pressure conduit lines 116, 117, 118, 119 and 120 communicate with said chambers 108, 109, 114, 112 and 111 respectively. The chamber 112 is connected to line 120 and chamber 111 through the bleed passage 121. The lines 116 and 119 constitute the valve input or control lines while line 118 constitutes the valve output line. Line 120 is connected to a sub-atmospheric pressure source whereas line 117 is open to the atmosphere whereby the pressure in chamber 109 is always substantially atmospheric.

In operation the valve is adapted to be actuated to an "on" or an "off" condition wherein the valve member 103 is in an upper or lower operative position respectively. When the valve member 103 is in the lower or "off" position as shown in Fig. 7, the flange portion 105 overlies and pneumatically blocks the aperture 102. Under these conditions it will be seen that a sub-atmospheric pressure exists in the chambers 111 and 112 and control line 119, and that an atmospheric pressure exists in the chambers 108, 109 and 114. Thus the differential pressure acting on the opposite sides of said valve flange portion 105 will hold said valve member in the "off" position. In this condition of the valve the pressure in the valve output line 118 will be atmospheric. To switch the valve to the "on" condition an atmospheric pressure impulse is initiated in the control line 119 thereby increasing the pressure in chamber 112. Before the pressures in chambers 111 and 112 can equalize by air flow through the restricted passage 121 the differential pressure acting on opposite sides of the diaphragm 113 will cause said diaphragm to be flexed upwardly thereby engaging and lifting the valve member 103 to an upper or "on" position wherein the flange portion 105 overlies and pneumatically blocks said aperture 101. In this condition of the valve the chambers 108, 114, 111 and 112 will be subjected to the said sub-atmospheric source acting through line 120 and hence the pressure in the valve output line 118 will be lowered to a sub-atmospheric level. When the valve member 103 is moved to said upper position it will be retained there by a differential pressure acting on opposite sides of the head portion 105. This differential pressure retaining the valve member 103 in the upper or "on" position will exist after the said pressure impulse in control line 119 has been terminated and will remain unchanged until a subsequent pressure impulse is initiated in the other control line 116 to thereby reset the valve to the "off" condition. It will be noted that when the valve is in the "on" condition the pressure in chamber 108 and in control line 116 will become sub-atmospheric due to their interconnection with chamber 114 through said passage 115.

When it is desired to reset the valve to the "off" condition, an atmosphereic pressure is initiated in the control line 116. This will serve to reduce the differences in pressures acting on diaphragm 110 so that the diaphragm and the valve member 103 may be lowered by the differential pressure now acting on said flange portion 105. Once this occurs the valve member 103 moves to and is again held in the "off" position shown in Fig. 7. The valve member 103 will be so held in the "off" position after the termination of the said pressure impulse in said control line 116 until an atmospherica pressure impulse is again initiated in the now evacuated control line 119. After the valve member 103 has been reset to the lower operative position of Fig. 7, the pressure in the valve output line 118 will be restored to an atmospheric level.

Figure 8:
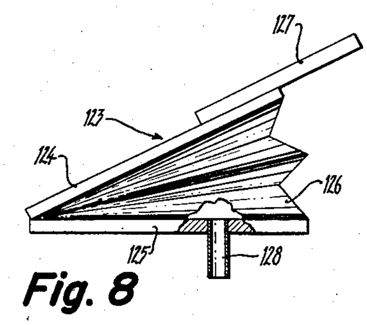

Referring to Fig. 8 there is shown a bellows actuator 123 comprising a pair of plates 124, 125 which are articulately interconnected at their respective left hand ends. A collapsible sheet 126 of leather or like material is secured between the respective adjacent edges of said plates to thereby define an airtight expandable and contractable chamber between said plates 124 and 125. An actuator arm 127 is secured to the upper plate 124, said arm being connectable in the link which is to be operated. A control line 128 pneumatically communicates with said chamber. It will be apparent that when line 128 is operatively connected to a source of sub-atmospheric pressure, said chamber will be evacuated and arm 127 will be moved downwardly with respect to the said plate 125.

The symbols used in the hereinafter described circuit diagram to designate the various above described pneumatic valves are shown in Figs. 9–17.

Figure 9:
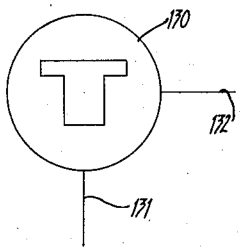
Figure 10:
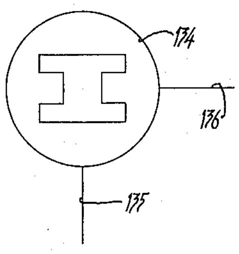
Figure 11:
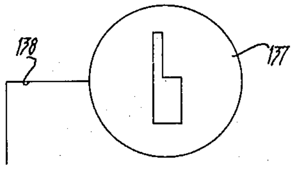
Figure 12:
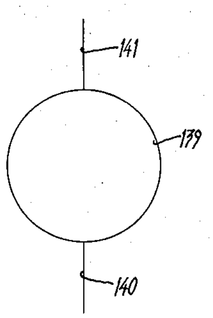
Figure 13:
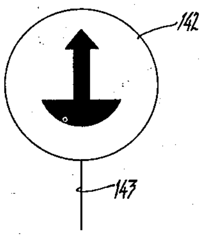
Figure 14:
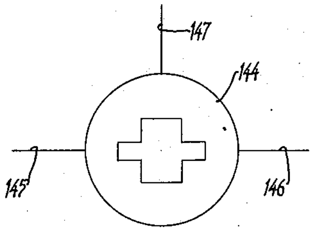

The secondary valve 130 of Fig. 9 has a control line 131 and an output line 132 which respectively correspond to the lines 24 and 22 of Fig. 2. The primary valve 134 of Fig. 10 has a control line 135 and an output line 136 which respectively correspond to the lines 38 and 36 of Fig. 3. The impulse valve 137 of Fig. 11 has an output line 138 which corresponds to the line 58 of Fig. 4. The blocking valve 139 of Fig. 12 has inlet and outlet flow lines 140 and 141 which correspond to the lines 66 and 67 of Fig. 5. The flow lines of the blocking valves which are used in the circuit diagram may be disposed at an angle of 90 or 180 degrees with respect to one another. The pouch actuator 142 of Fig. 13 has a control line 143 which corresponds to the line 86 of Fig. 6. The on-off valve 144 of Fig. 14 has two control lines 145 and 146 and an output line 147 which respectively correspond to the lines 116, 119 and 118 of Fig. 7.

Figure 17:
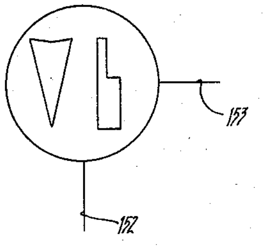
Figs. 9–17 show the symbols used for respectively designating the various pneumatic valves used in the instant apparatus.
Figure 15:
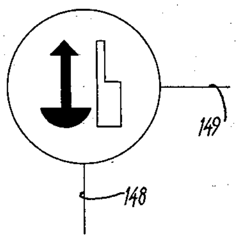
Figure 16:
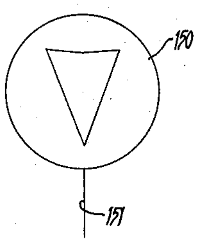

The symbol shown in Fig. 15 represents the combination of a pouch actuator and an impulse valve wherein said actuator in addition to operating some machine element actuates the movable arm of an impulse valve. The control line for the actuator is designated at 148 while the output line of said impulse valve is designated at 149. The bellows actuator 150 of Fig. 16 has a control line 151 which corresponds to line 128 of Fig. 8. The symbol shown in Fig. 17 represents the combination of a bellows actuator and an impulse valve wherein said bellows actuator in addition to operating some machine element actuates the movable arm of an impulse valve. The control line for the actuator is designated at 152 while the output line of the impulse valve is designated at 153.

Figure 19:
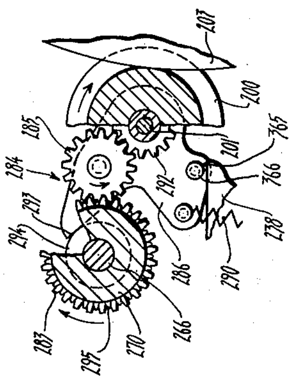
Fig. 19 is a detailed partial section view showing a portion of the record reel drive mechanism of Fig. 18.
Figure 18:
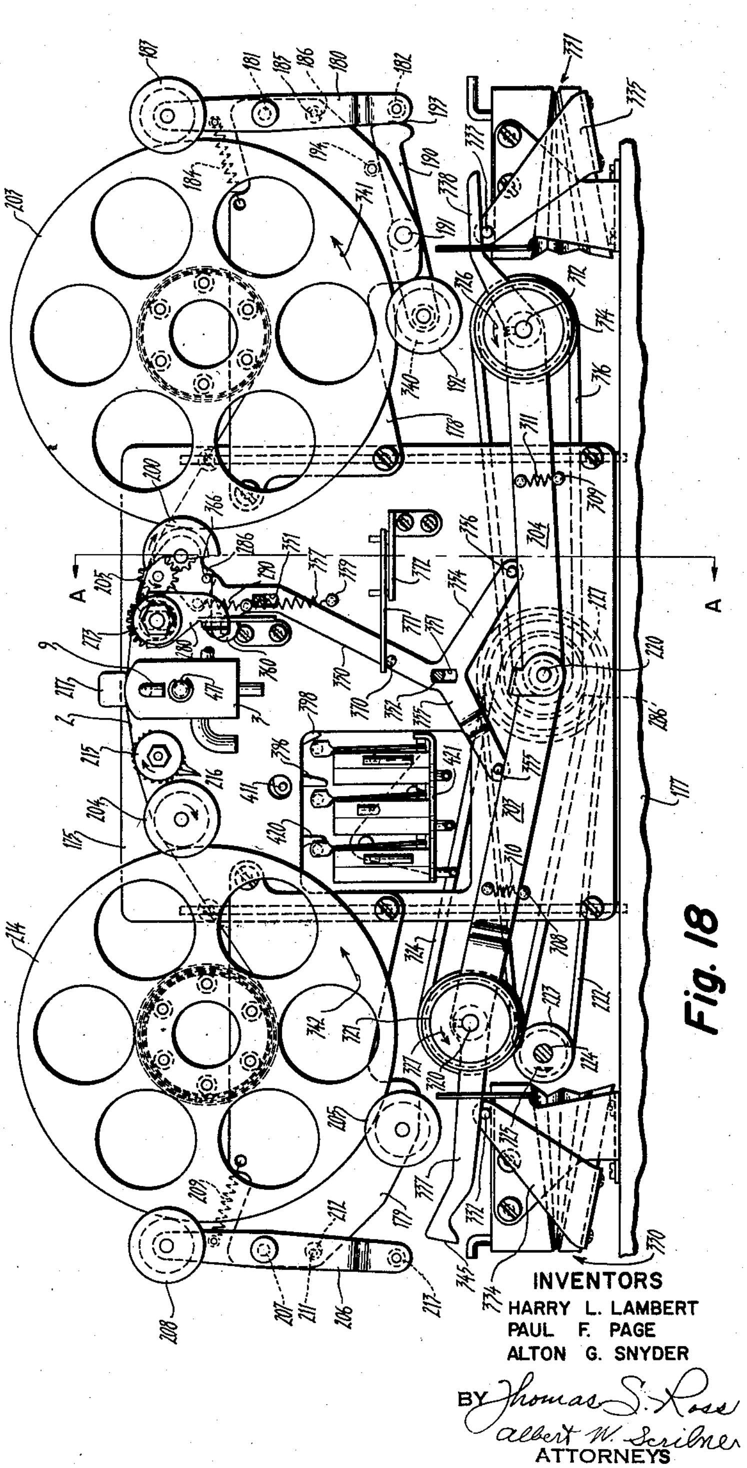
Fig. 18 is a side elevational view showing the general structural interrelation between the record reading head and the tape transport and feed mechanism.
Figure 20:
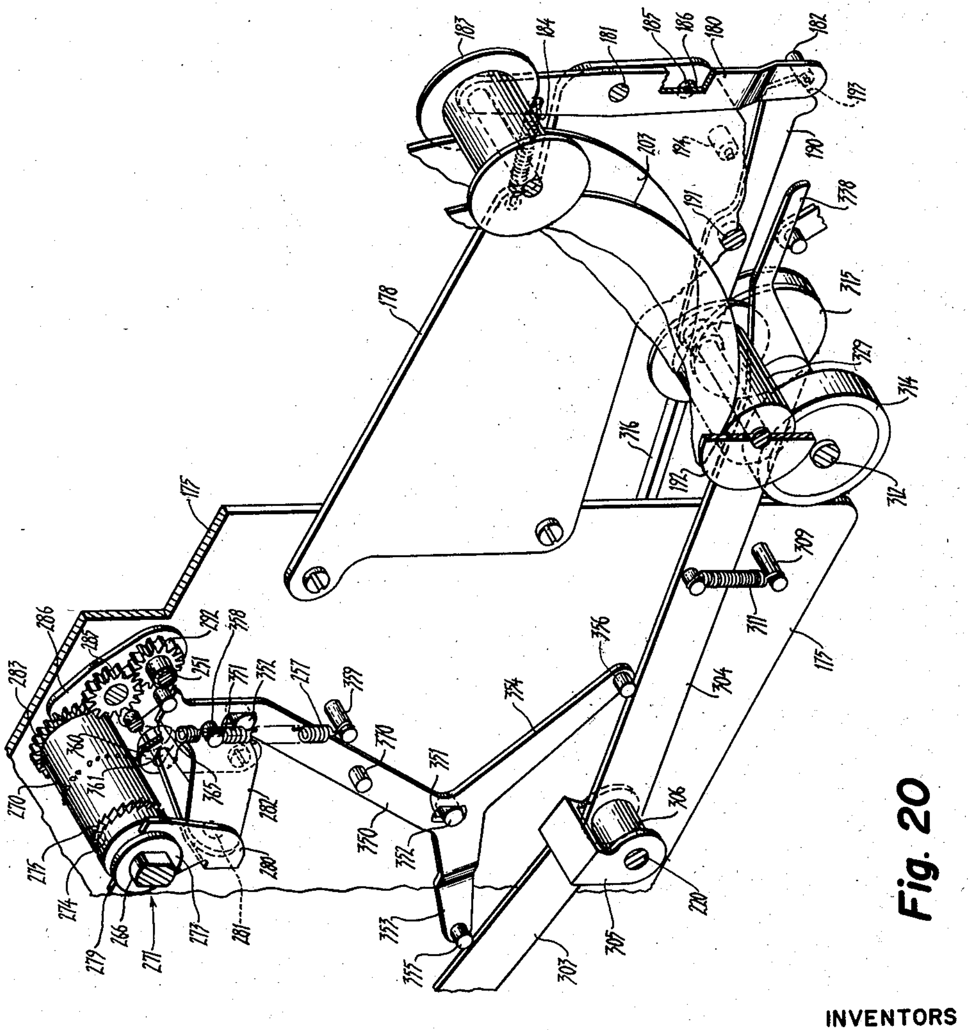
Fig. 20 is a perspective view showing a portion of the record transport mechanisms of Fig. 18.

The transport tape mechanism 1 mentioned above in connection with Fig. 1 will now be described in detail, particular reference being made to Figs. 18–21 of the drawings. A pair of main frame plates 175 and 176 are fixedly secured to a suitable base 177 and are vertically disposed in parallel spaced relation. The frame extension plates 178 and 179 are respectively fixedly secured to the right and left hand ends of the front frame plate 175. A lever 180, Figs. 18 and 20, is pivotally secured, as at 181, to the outer end of the extension frame plate 178; the lower end of said lever being provided with a laterally extending stud 182, while the upper end thereof rotatably supports the flanged spool 183. A spring 184 biases said lever in a counterclockwise direction as viewed in Fig. 18; the limits of rotative movement of lever 180 being determined by engagement of the lever pin 185 with the opposed walls of the aperture 186 formed in said plate 178. A second lever 190 is pivotally secured, as at 191, to the lower end of plate 178; the left end, Fig. 18, of lever 190 rotatably supporting a second flanged spool 192. An inclined cam surface 193 is formed on the right end of lever 190 and is adapted to slidably engage the said stud 182 of lever 180. The counterclockwise limit of rotational movement of lever 190 is determined by its engagement with the fixed stud 194 secured to said plate 178. A third flanged spool 200, Figs. 18 and 19, is rotatably mounted on the shaft 201 which is fixedly secured to the front frame plate 175.

The flanged spools 183, 192 and 200 are disposed in a common plane and are each adapted to axially straddle a conventional tape take-up reel 203 thereby cooperatively defining a three point peripheral support for rotatably mounting said reel 203. In operation the reel 203 may be rotatably driven at relatively slow or "read" speeds by frictional engagement with the driving spool 200 to thereby progressively draw the punched tape 2, Figs. 18, over the reader head 3 and onto the said reel 213. During such operation most of the weight of the reel 203 will be supported by spool 192 thereby causing lever 190 to swing counterclockwise into engagement with said pin 194. Meanwhile spring 184 biases the spool 183 into engagement with the periphery of reel 203 and in that the axes of said spools 183 and 200 are located at a level above the axis of reel 203, said reel will be yieldably retained in operative engagement with all three of said spools 183, 192, and 200. In this condition of the parts the stud 182 at the lower end of lever 190 will be spaced from the camming surface 193 on the end of said lever 190.

Flanged spools 204 and 205, Fig. 18, are respectively rotatably mounted on the left end of frame plate 175 and on the lower side of said frame plate 179. A lever 206 is pivotally mounted, as at 207, on the outer end of plate 179 and rotatably supports at its upper end the flanged spool 208. A spring 209 biases lever in a clockwise direction, Fig. 18, between two limits of pivotal movement determined by the engagement of the lever pin 211 with the opposed walls of the aperture 212 formed in said frame extension plate 179. The lower end of lever 206 is provided with a laterally extending stud 213.

The flanged spools 204, 205 and 208 are disposed in a common plane which is coextensive with the plane of said first three spools 183, 192 and 200. Said spools 204, 205 and 208 are each adapted to axially straddle and peripherally support the punched tape pay-out reel 214 in a manner similar to that of spools 183, 192, and 200. In that the axes of said spools 204 and 208 are located at a level above the axis of the "pay-out" reel 214, said reel will be yieldably retained in rotative engagement with all three of said spools 204, 205 and 208.

Figure 1:
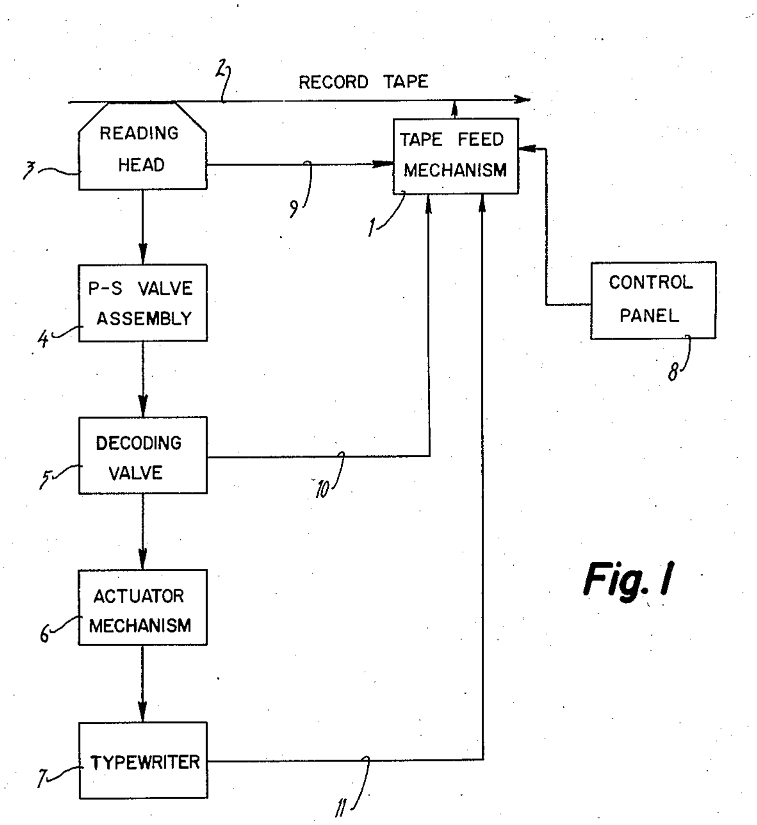
Fig. 1 is a block diagram illustrating the general nature of operation of the instant apparatus.

In the upper central portion of the main frame plate 175, there is secured a pneumatic tape reading head 3 referred to in connection with the block diagram of Fig. 1. The details of this portion of the apparatus will be described later. An idler tape feed sprocket drum 215 is rotatably supported by the frame plate 175. The drum 215 is provided with a plurality of coplanar peripherally spaced sprocket teeth 216, Fig. 18, which engage the usual central column of small feed holes formed in the punched tape 2. A tape guide block 217 is movably mounted on the frame plate 175 by any suitable means and is adapted to retain the tape 2 in operative sliding engagement with the upper surface of reading head 3.

The above described arrangement for rotatably mounting the tape reels 203 and 214, will permit said reels to be quickly and easily inserted into and removed from their respective operative positions shown in Fig. 18; such insertion or removal thereof being accompanied by a yielding pivotal movement of the levers 180 and 206. During normal "read" operations the tape 2 will be fed from the reel 214 over the spool 204, reading head 3 and the driven spool 200, and onto the reel 203.

The punched tape 2 may be driven in a forward direction, from left to right as seen in Fig. 18, at a relatively slow "read" speed by means of the said driving spool 200, or may be rapidly driven in a forward or reverse direction by a different drive means to be described. The rapid forward movement of the tape 2 will be hereinafter referred to as a skip-forward tape movement while a rapid reverse displacement thereof will be hereinafter referred to as a rewind tape movement. The pneumatic sensing or reading of the tape 2 occurs only when said tape is driven at said relatively slow speeds.

Figures 21, 22:
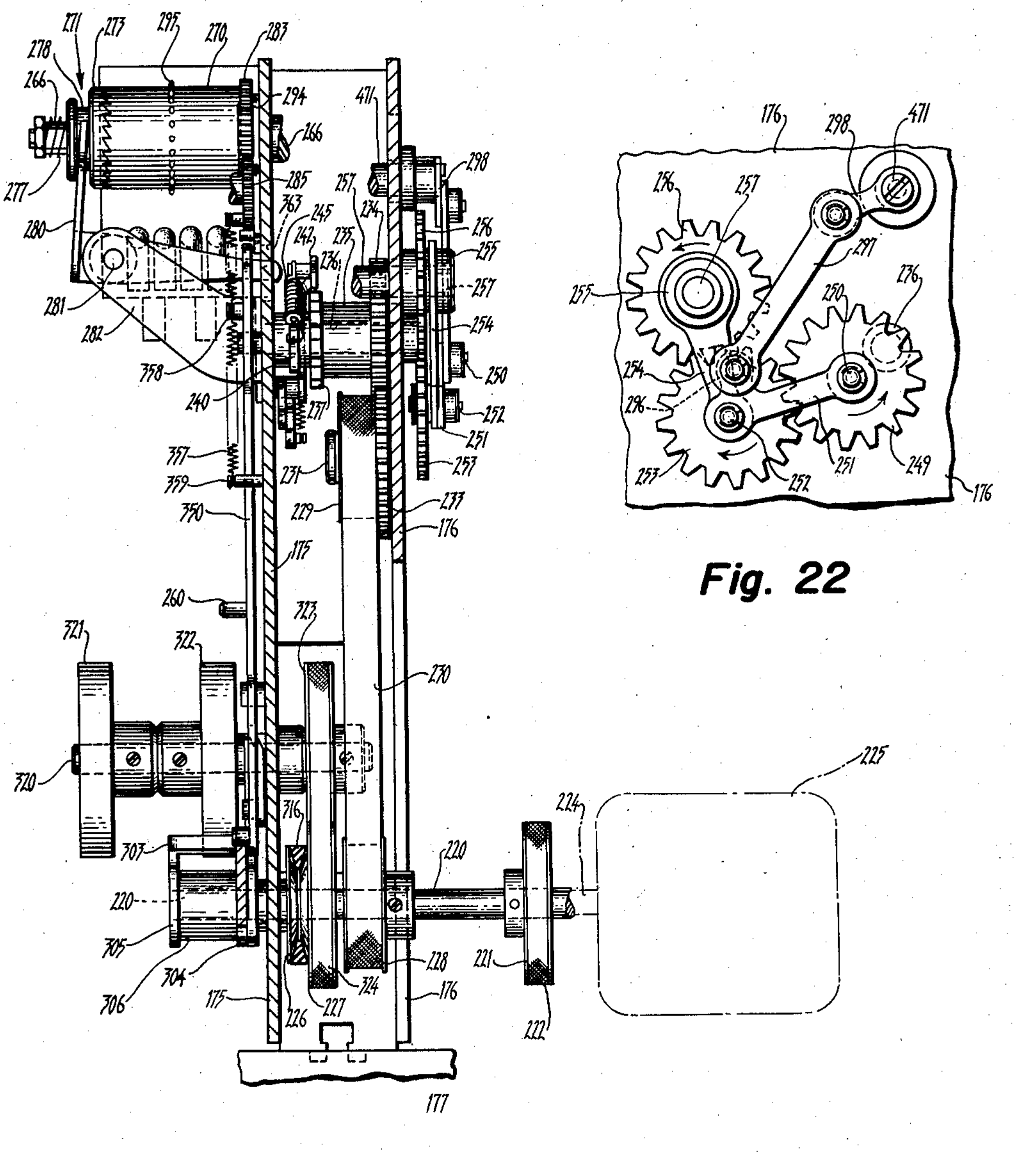
Fig. 21 is a vertical sectional view taken along section lines A—A of Fig. 18.
Fig. 22 is a detailed rear side elevational view showing a portion of the record feed drive mechanism.
Figure 24:
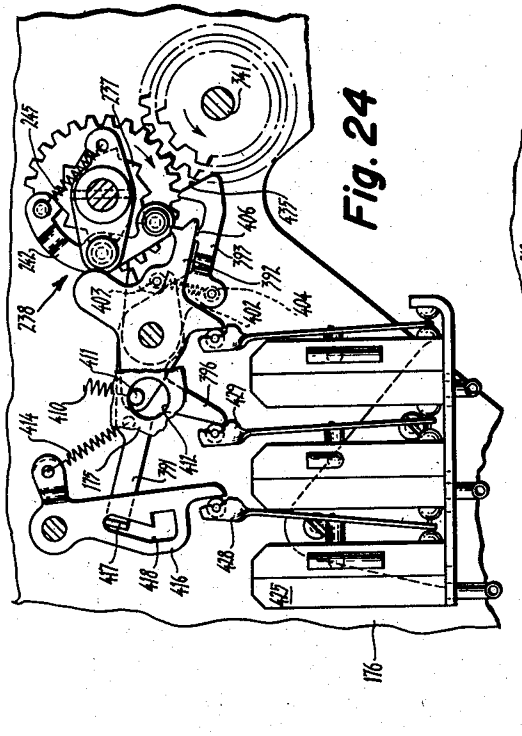
Figs. 23–25 are vertical partial sectional views showing various portions of the record feed drive mechanism.
Figure 25:
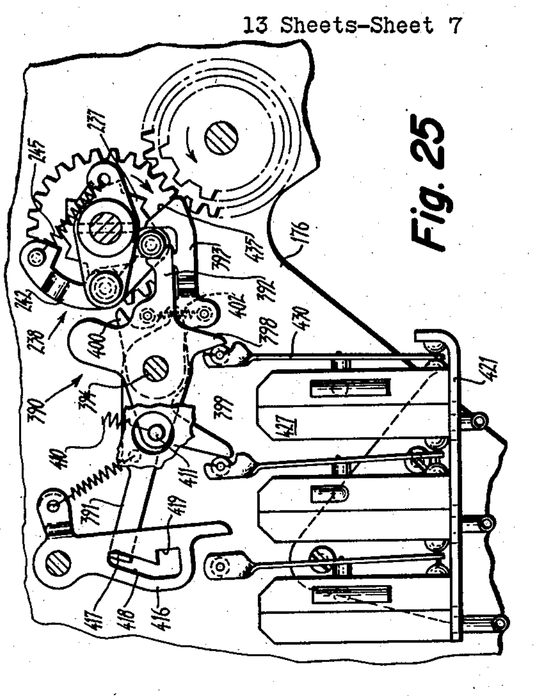
Figure 23:
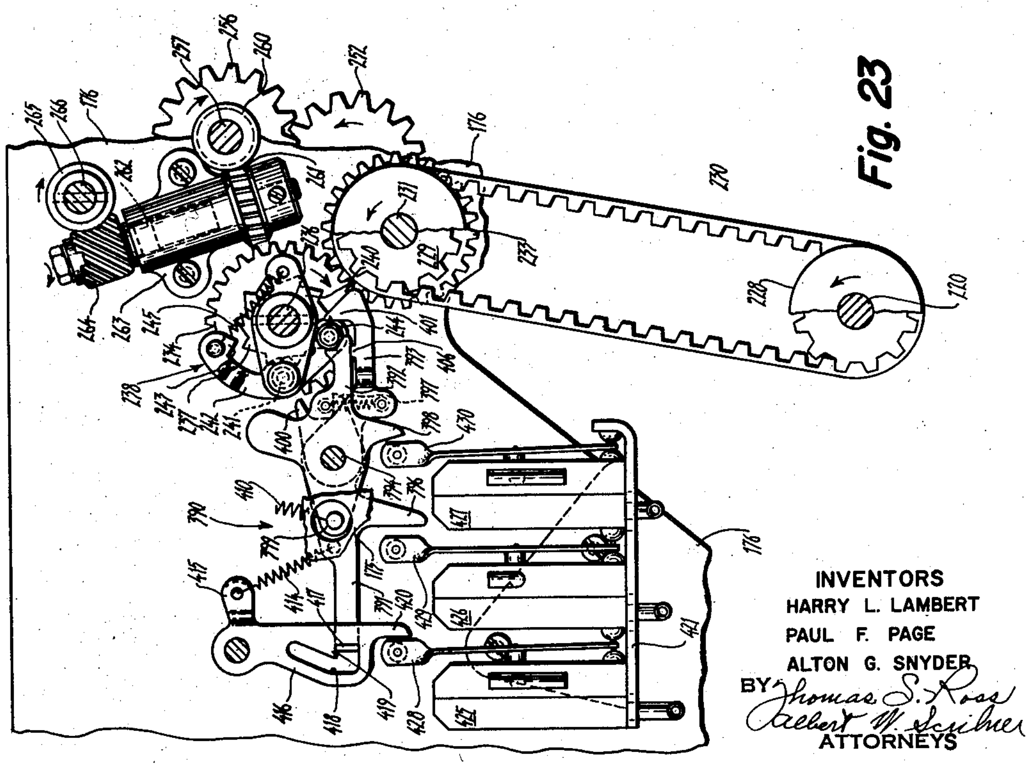

The means for rotatably driving the spool 200 will now be described in detail, reference being made to Figs. 18 and 21–25. The main drive shaft 220 of the machine is suitably journalled in the lower central portion of the frame plates 175 and 176. Rotatably secured to the inner end of the main shaft is a pulley 221, Fig. 21, which is driven through a belt 222 from a pulley 223, Fig. 18, which is secured to the shaft 224 of motor 225, Fig. 21. Three pulleys 226, 227 and 228, Fig. 21, are rotatably secured to the main shaft 220 and are disposed between said main frame plates 175, 176. The pulley 228 rotatably drives the pulley 229, Figs. 21 and 23, by means of a belt 230; said pulley 229 being rotatably mounted on the stub shaft 231 fixed on the frame plate 176. Integrally formed on the pulley 229 is a gear 233 having teeth which mesh with the teeth of a gear 234. Said gear 234 is provided with an elongated tubular hub portion 235, Fig. 21, and is rotatably mounted on the cross shaft 236 which is mounted in and disposed between said frame plates 175, 176. The left hand end, Fig. 21, of said hub portion 235 has a ratchet wheel 237 formed thereon. A clutch mechanism, generally indicated at 238 in Figs. 23–25, is provided to selectively couple the said shaft 236 with the ratchet wheel 237 formed on said hub 235. Said clutch comprises a clutch arm 240, Fig. 23, which is pinned to said cross shaft 236 at a point immediately adjacent the left end of said tubular hub portion 235, Fig. 21. Pivotally connected, as at 241, to the left end of said clutch arm 240 is a clutch pawl 242 having an inwardly projecting tooth 243 at its upper end and a stud 244 secured to its lower end. A spring 245 operatively connected between the upper end of said pawl and the right end of said arm 240 serves to bias said pawl in a clockwise direction so as to urge said pawl tooth 243 into operative engagement with the teeth of said ratchet wheel 237. It will be apparent that when said pawl tooth and ratchet are in engagement, the shaft 236 will be rotatably coupled with the ratchet wheel 237 so that when said hub portion is power driven in a clockwise direction, Fig. 23, by the belt 230, gear 233 etc. the shaft 236 will also be driven in the same direction.

A gear 249 is eccentrically mounted on the right hand outer end of shaft 236, Figs. 21 and 22. Pivotally secured to the center stud 250 of gear 249 is a connecting link 251 whose left hand end rotatably supports the hub 252 of the gear 253. Another link 254 is pivotally secured at its respective ends to the said hub 252 and to hub 255 of a gear 256, Figs. 21 and 22. Gear 256 is fixed to a shaft 257 which is rotatably mounted in the frame plates 175 and 176. The gears 249, 253 and 256 are adapted to remain meshed with each other so as to transmit the rotation of shaft 236, Fig. 22, to the shaft 257. In operation the gear 249 rotates about an axis which is eccentric to its geometric axis while the gear 253 rotates about its geometric axis and at the same time is capable of planetating about the geometric axes of both gears 249 and 256. Although the shaft 236 partakes of a uniform rotary motion the nature of the gear train of Fig. 22 is such as to impart an intermittent or start-stop rotary motion to the output shaft 257. The timing characteristics of the intermittent rotation of the shaft 257 will be considered later; suffice it to say here that when shaft 257 is being driven it will make one revolution, then hesitate motionless for a moment, then make another revolution, and so forth repeatedly. If desired further operational details for the gear linkage of Fig. 22 may be obtained by referring to our copending application Serial No. 642,764 filed February 27, 1957 for Perforated Record Reader and Feed Mechanism.

Fixed to the inner end of shaft 257 is a worm gear 260, Fig. 23, which meshes with the worm wheel 261. Wheel 261 is fixed to the lower end of a shaft 262 which is rotatably mounted in the bearing bracket 263 secured to the inner side of said frame plate 176. The helical gear 264, fixed to the upper end of shaft 262, meshes with a helical gear 265 which is fixed on the cross shaft 266, Figs. 19, 21 and 23, that is rotatably supported by both of said frame plates 175 and 176.

Referring to Figs. 19–21, the shaft 266 rotatably supports the tape feed sprocket drum 270. The sprocket drum may be rotatably coupled to or uncoupled from the same shaft 266 by means of a clutch which is generally designated by reference numeral 271. Said clutch 271 comprises an axially movable member 273 provided with teeth 274 which are adapted to operatively engage the corresponding teeth 275, Fig. 20, formed on the adjacent end of the sprocket drum 270. A compression spring 277 operatively mounted between the respective left hand ends of the shaft 266 and the member 273 serves to yieldably bias said member 273 into coupling engagement with the sprocket drum 270. The member 273 is provided with a peripheral groove 278 in which are disposed the arms 279 of the clutch operating yoke 280. Said yoke 280 is pivotally mounted, as at 281, on the bracket 282 which is suitably fixed to the main frame plate 175. It will be apparent that the clutch member 273 may be moved to its respective coupling and uncoupling positions by pivotally actuating the said yoke 280.

A gear 283, Figs. 19 and 20, is formed on the inner end of the sprocket drum 270. Said gear 283 is rotatably connected to the said spool 200 through a clutch which is generally indicated at 284 in Fig. 19. A gear 285 rotatably mounted on the gear plate 286 is adapted to be swung into mesh with said gear 283. The plate 286 is pivotally mounted on the shaft 289 secured to the main frame plates 175, 176 and is biased in a counterclockwise direction by means of a tension spring 290. Gear 285 meshes with a gear 292 which is rotatably mounted on said shaft 201 and which is coaxially fixed on said tape reel driving spool 200, Figs. 18–20. The limit of counterclockwise movement of said gear plate is determined by the engagement of the gear plate nose 293, Fig. 19, with a peripheral shoulder 294, Fig. 21, formed on said sprocket drum 270. In the counterclockwise position of gear plate 286 the clutch 284 will be operatively engaged so that the rotary motion of the sprocket drum 270 may be transmitted to the said spool 200. As will be evident later the clutches 271 and 284 are operated simultaneously, i.e. at any given time said clutches are either both engaged or both disengaged.

The above described gearing serves to rotatably connect the tape reel drive spool 200 and the sprocket drum 270 with the main drive shaft 220, Figs. 18 and 20, when said clutches 238, Fig. 23, 271, Fig. 20, and 284, Fig. 19, are in their respective engaged or coupling conditions. Although the main drive shaft 220 continually rotates at a substantially constant rate, the special gear train of Fig. 22 serves to cause an intermittent rotation of both the sprocket drum 270 and the spool 200. The gearing between said shaft 236, Fig. 22, and the drum 270 has a speed reduction ratio such that for each revolution of shaft 236 the periphery of the tape feed sprocket drum 270 will be displaced through an arcuate distance which is equal to the pitch of the peripherally spaced sprocket teeth 295, Fig. 21. Thus during normal tape reading operations the tape 2 of Fig. 18 will be intermittently fed from left to right; the short time intervals between the successive separate and uniform feed motions of said tape allowing the reading head 3 to pneumatically sense or read the perforations in said tape.

Referring back to Fig. 22, the link 251 is provided with an upwardly extending projection 296 which articulately supports one end of a link 297. The other end of said link is pivotally secured to the outer end of the crank arm 298 which is fixed to the rotatable pneumatic valve operating stem 471, Figs. 18 and 26, of the reader head 3. Due to the nature of the gear train of Fig. 22, the connecting link 297 will partake of a reciprocating type of motion which will periodically oscillate the crank arm 298 thereby arcuately displacing the said valve operating stem 471 in timed relation to the intermittent rotation of the shaft 257, Fig. 22. Thus the successive feed motions of the tape 2 of Fig. 18 are timed with respect to the operation of the pneumatic tape sensing mechanism of the reading head 3. This timed relation is such that the reading head 3 will be conditioned to pneumatically sense a transverse row of holes punched in the record tape 2 only during the said short time interval between the said successive feed motions of said record tape. Each of said successive feed motions imparted to the tape by the said predetermined amount of periodic rotation of the sprocket drum 270 serves to bring each successive transverse row of said punched holes to a proper reading position on the head 3.

As previously mentioned, means are provided for rotatably driving the tape reels 203 and 214, Fig. 18, at rapid speeds for skip-forward and rewind operations. Such means comprise a pair of lever arms 303 and 304, Figs. 18 and 20, which are pivotally mounted on the outer end of the main drive shaft 220; the bail like hub portion 305, Fig. 20, of lever arm 303 straddling the cylindrical hub portion 306 of lever arm 304. Said arms 303 and 304 are normally biased downwardly into engagement iwth the fixed studs 308 and 309 by means of tension springs 310 and 311 respectively. Rotatably mounted near the outer end of arm 304 is a short shaft 312. A drive wheel 314 and a pulley 315 are secured to the respective ends of said shaft 312. The pulley 315 and the pulley 226, Fig. 21, mounted on the main drive shaft are coplanar and are interconnected by a belt 316. The drive wheel 314 and the flanged spool 192 are substantially coplanar, Fig. 18; the former being adapted to be moved into engagement with the latter. A shaft 320 is rotatably mounted near the outer end of the lever arm 303 and a pair of drive wheels 321 and 322 and a pulley 323 are rotatably secured to said shaft 320 as shown in Fig. 21. Drive wheels 321 and 322 are respectively coplanar with main side flanges of the tape reel 214. The pulley 323 and said pulley 227 mounted on the main drive shaft are coplanar and are interconnected by a belt 324, Fig. 21. The motor shaft 224, Fig. 18, rotates at a substantially constant speed in the direction shown by arrow 325; hence the said drive wheels 314, 321 and 322 will be constantly rotated in the directions shown by arrows 326 and 327. The peripheral contact surfaces of the drive wheels 314, 321 and 322 as well as the cylindrical portion 329 of the spool 192 are preferably coated with rubber or like material in order to improve the driving efficiency thereof.

Two bellows actuators 330 and 331 are operatively mounted on the said base 177 and the pins 332 and 333 secured to the ends of the movable arms 334 and 335 thereof respectively engage and are adapted to lift the outer ends 337 and 338 of said lever arms 303 and 304. When the bellows actuator 331 is operated the rotating drive wheel 314, Fig. 20, will be elevated into frictional engagement with the cylindrical body portion 340, Fig. 20, of said flanged spool 192, and will rotatably drive the latter. Said spool 192 being in supporting engagement with the periphery of the take-up reel 203 will thereby rotatably drive said reel in the direction indicated by arrow 341 of Fig. 18. When reel 203 is being thus driven the reel 214 will be rotated by the tension in the tape 2 and in a direction noted by the arrow 342, thereby effecting a skip-forward movement of the tape 2. It will be noted that when drive wheel 314 exerts an upward contact force on the spool 192, the camming surface 193 on the outer end of lever 190 will engage the pin 182 as shown in Fig. 20 and will outwardly displace the lower end of lever 180 to a slight extent thereby positively moving and holding the spool 183 against the periphery of reel 203 so as to overcome any tendency for said reel to move upwardly out of operative contact with the three spools 183, 192, 200.

In like manner when the bellows actuator 330 is operated the rotating drive wheels 321 and 322 will be elevated into direct frictional engagement with the periphery of the reel 214 to thereby rotatably drive the latter in a direction opposite to that shown by arrow 342. When the reel 214 is thus driven the reel 203 will be rotated by the tension in the tape in a direction opposite to that indicated by arrow 341 to thereby effect a rewind movement of tape 2. When said bellows actuator 330 is operated the end edge 345 of the lever arm 303 will be moved to a position so as to lie immediately to the right of the pin 213 of lever 206, Fig. 18. In this condition of the parts the flanged spool 208 will be positively held in engagement with the periphery of reel 214 to thereby resist any tendency for said reel to be lifted out of operative engagement with the three spools 214, 205 and 208 when saidd rive wheels 321 and 322 are in frictional driving contact with the periphery of said reel 214. Upon the termination of operation of the said bellows 330 and 331, springs 310 and 311 will restore the lever arms 303 and 304 to their respective normal positions shown in Fig. 18.

In order to prevent a simultaneous operation of the slow and rapid speed drives for the tape reels 203 and 214, an interlock mechanism is provided whereby when either the skip-forward or the rewind drive for said reels is operated, the "read" or slow speed drive for the spool 200 is disabled. Referring to Fig. 18, said interlock mechanism comprises a lever 350 having slots 351 formed therein, the walls of which are engaged by the studs 352 secured to the main frame plate 175. The lower end of the vertically movable lever 350 has two arms 353 and 354 which are respectively provided with pins 355 and 356. Lever 350 is biased downwardly by a tension spring 357 which is secured between the lever 350 and a frame plate stud 359, the lower limit of movement of said lever being determined by the engagement of either of the pins 355, 356 with the upper edges of lever arms 303 and 304. The upper end of lever 350 is provided with a laterally extending arm 360, Fig. 20, in which is formed an aperture 361. The inner end of the said clutch yoke 280 extends through said aperture 361 and also through the aperture 363, Fig. 21, formed in the frame plate 175.

It will be evident that when either of the lever arms 303 or 304 is elevated in order to engage the rapid drive for the tape reels, the lever 350 will be also elevated so as to pivotally displace the clutch yoke 280 in a counterclockwise direction, Fig. 21, thereby disengaging the clutch 271 and discontinuing the power drive to the tape feed sprocket drum 270 and the tape reel driving spool 200. The clutch 271 will not be reengaged until the actuated arm 303 or 304 has been lowered to its inoperative position shown in Fig. 18.

During a rewind or a skip-forward operation it is desirable to avoid any undue longitudinal stresses on the tape 2 which might be imposed by having the latter rapidly accelerate and drive the sprocket drum 270 through spool 200 and the gears 285 and 283. In order to obviate this potential difficulty, means are provided to disengage the clutch 284 and to thereby permit the sprocket drum 270 to rotate idly on its supporting shaft 266 during rewind or skip-forward operations. Such means comprise a shoulder 365, Fig. 20, which is formed on the upper end of lever 350 and which underlies a pin 366, Figs. 18 and 19, fixed to the said pivotal gear plate 286, Fig. 19. When lever 350 is elevated as above described the shoulder 365 thereof will engage and lift the pin 366 thereby swinging said gear plate 286 in a clockwise direction about the shaft 289 against the action of spring 290, Fig. 19. Clutch 284 being thus disengaged, the sprocket drum 270 is free to idly rotate on its supporting shaft 266. When lever 350 is lowered, spring 290 will swing the gear plate 286 in a counterclockwise direction so as to operatively reengage the said clutch 284 at the same time that the clutch 271 is being reengaged. Lever 350 is further provided with a pin 370 which is adapted to engage and lift the arm 371 of the impulse valve 372, Fig. 18, during the upward movement of said lever 350. The purpose of the impulse valve 372 will be explained below in connection with the circuit diagram of Figs. 36 and 37.

Referring again to Fig. 23 it will be recalled that the gearing which interconnects the main drive shaft 220 and the said sprocket drum mounting shaft 266 includes the clutch 238. Said clutch is engaged and disengaged by respectively moving said pawl 242 to a clockwise position as shown in Fig. 24, and to a counterclockwise position as shown in Fig 23. The operation of said pawl is controlled by a clutch control assembly 390 which is shown in three of its active positions in Figs. 23–25. Said assembly essentially comprises three cooperating levers 391, 392, and 393, Fig. 23, each of which is pivotally mounted on the shaft 394 secured to the main frame plate 175. For a proper understanding of the operation of clutch assembly 390, it is essential to know the general shape of each of said three levers. Lever 391 has a horizontally extending finger 397 and a depending arm 396. Lever 392 has a depending arm 398 and a horizontal arm 399. Lever 393 has a hooked portion 401 at the right hand end thereof and an upper finger 400.

A spring 402, Fig. 24, operatively connected between the studs 403 and 404 respectively secured to levers 392 and 393 serves to rotatably bias these two levers towards each other so that the upstanding lug 406, Fig. 23, on the lever 393 engages the lower edge of the lever 392. The lever 392 is biased in a clockwise direction by means of a spring 410 which is operatively connected between the machine frame and the pin 411 secured to the end of said arm 399 of lever 392. The clockwise limit of rotational movement of lever 392 is determined by the engagement of said pin 411, Fig. 24, with the upper edge of an aperture 412 formed in the main frame plate 175. The lever 391 is also biased in a clockwise direction by means of a spring 414, Fig. 23, which is operatively connected to the arm 415 of the pivotally mounted detent latch 416. The left hand end of lever 391 has a bent over portion 417 which slidably cooperates with the walls of a contoured slot 418 formed in said latch 416. In the position of the parts shown in Fig. 23 the tension spring 414 serves to yieldably bias the latch 416 in a clockwise direction to thereby retain the bent over portion 417 of lever 391 in the lower notched portion 419 of said slot 418.

The bracket 421, Fig. 23, secured to the frame plate 176 supports three pouch actuators 425, 426, and 427. The free ends of the arms 428, 429 and 430 of said actuators are adapted to be displaced clockwise about their respective lower ends so as to engage and actuate the depending arms 420, 396 and 398 of latch 416, lever 391 and lever 392 respectively. It will be seen that by selectively operating said actuators 425—427 the assembly 390 may be controlled so as to operatively couple or uncouple the pawl 242 and the ratchet wheel 237, Fig. 23, to thereby control the power drive connections to the said tape feed sprocket drum mounting shaft 266.

With the parts in their respective positions shown in Fig. 23, the finger 397 of lever 391 is in underlying contact with the stud 403 of lever 392 and thereby retains the cooperating right hand ends of levers 392 and 393 in straddling engagement with the pin 244 of the clutch pawl 242. The pawl is thus held immobile and out of engagement with said ratchet wheel 237 and hence clutch 238 will remain in the uncoupled condition. To engage the clutch 238 and start the "read" speed tape drive, the actuator 425 is operated to thereby swing the latch 416 in a counterclockwise direction thereby allowing lever 391 to be moved out of notch 419 and to swing to its clockwise position, Fig. 24, under the action of spring 414. During this movement of lever 391 said stud 403 of lever 392 will follow the downward movement of the finger 397 of lever 391 through the action of spring 410 which biases said lever 392 in a clockwise direction. This movement of lever 392 will cause the lever 393 to be rotated clockwise, said lever 392 normally being in overlying contact with the lug 406 of lever 393. In this manner the respective right hand ends of levers 392 and 393 are moved downwardly out of straddling engagement with the pawl pin 244 to thereby allow said pawl to rotate clockwise, under the action of spring 245, into operative engagement with the ratchet wheel 237 as shown in Fig. 24. In this condition of the parts the tape feed sprocket drum mounting shaft 266, Fig. 23, will be connected to the main drive shaft 220 and will thereby intermittently feed the punched tape 2 over the reading head 3 at a relatively slow "read" speed. After said actuator 425 has been operated to allow the parts to be moved to the respective positions shown in Fig. 24, the actuator arm 428 may be restored to its normal position shown in Fig. 23, and the pawl 242 will remain in driving engagement with the ratchet wheel 237 thereby maintaining the drive connections to said sprocket drum 270.

When it is desired to disengage the clutch 238, either of the actuators 426 or 427 is operated. If actuator 426 is operated the clutch will be permanently disengaged, i.e. the parts will be restored to their respective positions shown in Fig. 23, and will remain there after the arm 429 of actuator 426 has been restored to its normal position of Fig. 23. If the actuator 427 is operated the clutch 238 will be temporarily disengaged, i.e. the pawl 242 will remain out of engagement with the ratchet wheel only as long as the actuator arm 430 remains in its clockwise or actuated position. Hence which actuator, 426 or 427, is operated will depend on whether a temporary or a permanent stop of the tape feed drive is desired.

When the actuator 426 is operated the free end of its arm 429 will engage the depending arm 396 of lever 391, Fig. 24, and will rotate the latter in a counterclockwise direction so that the bent over portion 417 of lever 391 will ride downwardly in the latch slot 418, and become locked in notch 419 as shown in Fig. 23. This movement of the lever 391 will cause its extension arm 397 to lift the stud 403 on the lever 392 and thereby rotate both of the levers 392 and 393 in a counterclockwise direction. When the two levers 392 and 393 are thus restored to their respective positions shown in Fig 23, the respective right hand ends thereof will move into the circular path of travel of the now clockwise movement of pin 244 of the pawl 242. Said pin will engage the camming surface 435, Fig. 24, at the right end of lever 393 and will cam the latter downwardly relative to the lever 392 against the action of the spring 402, Fig. 24. After the pawl pin 244 has ridden over the said camming surface 435, said pin will be arrested by the contoured end of lever 392 so that continued inertial movement of the pawl mounting pin 241 will swing the upper end of the pawl out of driven engagement with the ratchet wheel 237. Meanwhile the lever 393 will have been restored to its counterclockwise position, Fig. 23, under the action of its associated spring 402, whereby the respective right hand ends of the levers 392, 393 again straddle the said pawl pin 244 to hold the upper end of the pawl out of engagement with said ratchet wheel. In this manner the clutch 238 remains disengaged, until the latch 416 is again rotated by the actuator 425 to release the lever 391 for clockwise movement.

When the temporary stop actuator 427 is operated the arm 430 will engage the depending arm 398 of lever 392 and will directly rotate the levers 392 and 393 in a counterclockwise direction against the action of spring 410 so that the respective right hand ends of said two levers are again moved into the orbital path of the pawl pin 244 as shown in Fig. 25. This will cause the clutch 238 to be disengaged in the manner above described. It will be noted however that as soon as the actuator arm 430 is restored to its normal counterclockwise position shown in Figs. 23 and 24, the levers 392 and 393 will be restored to their respective positions shown in Fig. 24 under the action of spring 410 and thereby allow said pawl to again engage ratchet wheel 237. Thus actuator 427 is operated where only a momentary interruption in tape feed drive is desired.

When the respective right hand ends of levers 392 and 393 straddle the pawl pin 244, as shown in Figs. 23 and 25, to retain the clutch 238 in the uncoupled condition, the shaft 236, Fig. 23, and the gear train of Fig. 22 are held in fixed rotative position. This position is such that the link 297, Fig. 22, will maintain the valve stem 471 in its closed position of Fig. 28 wherein, as will be subsequently explained, no pneumatic sensing of the punched tape can occur. Thus it will be apparent that the operation of the pneumatic reading head 3 will be interrupted during the skip-forward or rewind movement of the tape 2.

The pneumatic record reading head 3 is shown in detail in Figs. 26–28. Said head comprises a main block 460 which is secured to the main frame plate 175, Fig. 18, by any suitable means. Said block has seven vertically disposed parallel open ended bores which respectively terminate at ports R1, R2, R3, R4, R5, R6 and R7 in the upper surface 462 of said block. The size and spacing of said ports is such as to correspond to the standard size and lateral spacing of the punched holes of a conventional type record tape. The two bores respectively associated with ports R2 and R5 each extend vertically downward through the block 460, Fig. 26, and communicate with an external pressure conduit line 464, Figs. 27 and 28. The four bores respectively associated with ports R1, R3, R4 and R6 each extend downwardly and communicate with a bore 465, Fig. 26, which in turn communicates with an external pressure conduit line 466, Fig. 27. The seventh bore associated with the port R7 communicates with the bore 467, Fig. 26, which in turn communicates with the said pressure conduit line 9, Figs. 1 and 18. A horizonal bore 470 formed in the block 460 intercepts all of the said vertical bores except that associated with the port R7. Rotatably mounted in said bore 470 is a valve stem 471 which has six diametral bores 473, Fig. 27, and six radial bores 474 which respectively communicate with said diametral bores. When the valve stem 471 is operatively mounted in the block 460, the vertical plane of the axis of each diametral bore 473 and its associated radial bore 474 includes the axis of a different one of the bores associated with said ports R1–R6. A horizontal chamber 477 formed in the block 460 communicates both with the bore 470, as at 478, and the external line 480 through the chamber 481. Line 480 is connected to a sub-atmospheric pressure source.

As shown in Fig. 27 the reading head 3 may be conditioned for a record sensing operation by rotating the valve stem 471 to a counterclockwise position wherein the six diametral bores 473 respectively communicate the six ports R1–R6 with said six output pressure conduit lines 464 and 466. To pneumatically disable the head 3 the valve stem is rotated to its clockwise position shown in Fig. 28, wherein each of the diametral bores and its associated radial bore serve to pneumatically communicate one of the conduit lines 464 or 466 with the chamber 477 and the sub-atmospheric pressure line 480. The lines 464, 466 and 480 and the bearing connections for the valve stem 471 are secured to the block 460 so as to be in pneumatically sealed engagement therewith. Secured to the left hand end, Fig. 26, of the valve stem is the said crank arm 298, Fig. 22, and link 297 which periodically oscillate said stem 471. The oscillation of said valve stem 471 will not affect the communication between said port R7 and the line 9.

Figure 29:
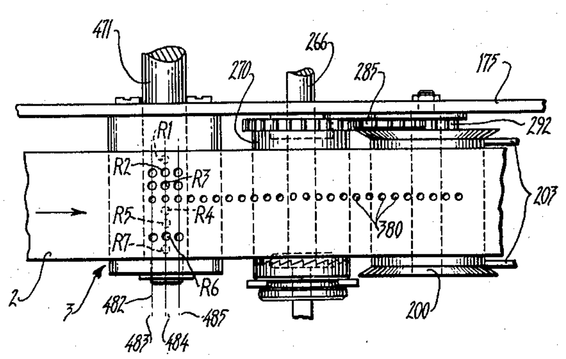
Fig. 29 is a plan view showing the record reading head, the record feed sprocket drum and related structure.

An explanation of the general operation of the apparatus described in connection with Figs. 18–28 will be made with reference to Fig. 29. The punched record tape 2 used with the instant apparatus is of a conventional type having a plurality of successive transverse rows of holes punched therein. The pattern of distribution of the holes in each of said rows corresponds to the standard communication code. The "six level" coded punched tape 2 is progressively fed from left to right over the reading head 3 by means of the intermittently rotating sprocket drum 270 whose sprocket teeth 295, Fig. 21, successively engage the usual "feed" holes 380 in the punched tape. It will be recalled that the intermittent rotational advancement of the sprocket drum 270 occurs in timed relation to the oscillation of the valve stem 471. This timed relation is specifically arranged as follows. During the time that the sprocket drum 270 is being rotated one step to advance the next transverse row 482 of punched holes from a position 483 toward the reading head 3, the valve stem 471 will be positioned in its closed or clockwise position, Fig. 28. At the end of this cycle of intermittent rotative advancement of the drum 270, the said transverse row 482 of punched holes will have been brought to the position 484 wherein said holes register with several of the ports of the reading head 3; in this case with ports R2, R3 and R6. Shortly thereafter the valve stem 471 will be rotated to its counterclockwise or open position as shown in Fig. 27 so that said reading head may pneumatically sense the presence of the holes in said transverse row. In that the pressure in all of the output lines 464, 466 and 467 is normally sub-atmospheric, an atmospheric pressure impulse will be initiated at any of the respective ports R1–R7 which are uncovered by said holes and no such impulses will be initiated at the respective ports which are covered by the unpunched portions of the said tape. It will be apparent that said atmospheric pressure impulses will be transmitted through the block 460 and into the respective pressure conduit lines 464, 466 and/or 467 associated with said uncovered ports. Shortly after the valve stem 471 has been brought to its said open position wherein the presence and distribution of said holes in the row 482 are sensed, it will be restored to its clockwise or closed position shown in Fig. 28 wherein all of the ports R1–R6 will be pneumatically cut off from the said lines 464 and 466. Thereafter the next cycle of the intermittent rotative advance of the sprocket drum 270 commences thereby moving said transverse row 482 of holes to a position 485, Fig. 29, and bringing the next following transverse row of holes into said operative position 484 on the reading head 3. During this advancement of the punched tape, and while said valve stem is in its said closed position, the pressure conduit lines 464 and 466 will be in communication with the bleeder line 480, Fig. 28, so that any air which has entered the lines 464 and 466 during said sensing operation will be withdrawn through said bleeder line 480. Each reading cycle comprises an advance of the tape 2 and a sensing of one transverse row of holes therein. Said cycle may be executed within a relative short time interval, for example, one fifteenth of a second.

Referring again to the block diagram of Fig. 1 it will be noted that the pressure impulses from the reading head 3 actuate the primary-secondary valve assembly 4 which in turn controls the operation of the decoding valve assembly 5. The three valve assemblies 3, 4 and 5 are further shown and described in the circuit diagram of Figs. 36 and 37, while the pertinent parts of the actuator assembly 6 and the typewriter 7 are shown and described in Figs. 30–35 inclusive.

The electric typewriter used with the instant apparatus may be any one of the various makes presently commercially available. For illustrative purposes the various parts of the electric typewriter shown and described in connection with Figs. 30–35 are similar to those in the machines presently being produced and sold by the Royal McBee Corporation. Unless otherwise indicated it will be understood that said parts are suitably supported by the main frame of the machine.

Figure 30:
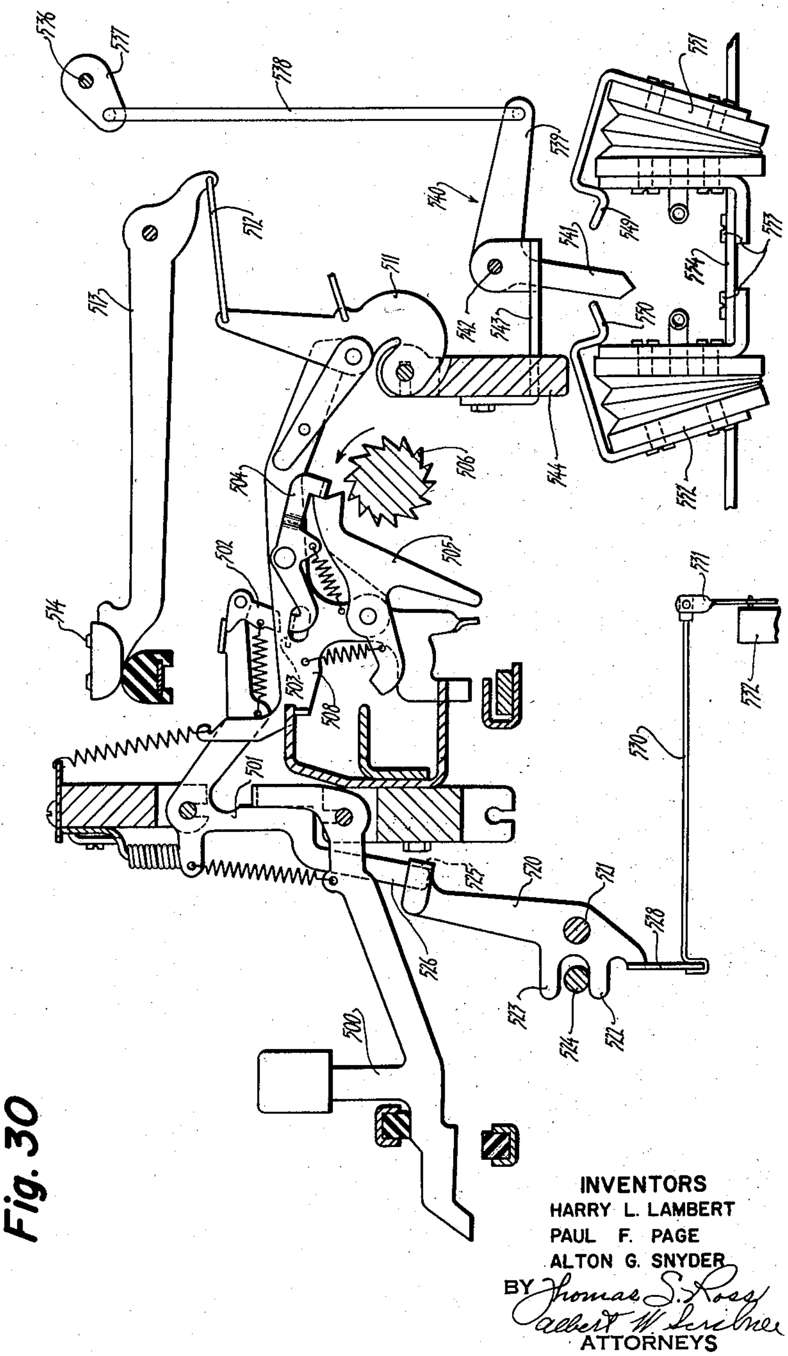
Fig. 30 is a side elevation in partial section showing a type bar control linkage and the ribbon color change device provided in the typewriter used with the instant apparatus.

The type action shown in Fig. 30 comprises a pivoted key lever 500 which, when depressed, rotates the link 501 in a clockwise direction thereby lowering the spring biased detent 502 into engagement with the pad 503 of the pivoted lever 504. The resultant counterclockwise movement of lever 504 serves to unlatch and release the spring biased pawl 505 for rotative movement into engagement with the teeth of the power driven serrated roll 506. Roll 506 will drive the pawl 505 and its supporting link 508 to the left thereby rotating the bell crank 511 in a counterclockwise direction which movement, through link 512, serves to impart a rapid pivotal movement to the type bar 513 which brings the type 514 into printing impact with the paper supported by the cylindrical platen 515. After the printing stroke of said type bar the various parts are restored to their respective normal positions shown in Fig. 30. This type action is of a conventional nature and needs no further explanation here.

Each of the type bar control linkages is provided with a supplemental operating linkage. Said linkage comprises a lever 520 which is pivotally mounted on a cross shaft 521 and which is located beneath the normal complement of key levers 500. The two spaced projections 522 and 523 formed on said lever 520 straddle a second cross shaft 524 and cooperate therewith to determine the rotational limits of movement of lever 520. The bent-over portion 525 at the upper end of lever 520 lies immediately to the rear of the edge of the lower extension 526 of said lever 501. A depending projection 528 at the lower end of lever 520 is adapted to be engaged by the U-shaped end of the link 530 that is connected to the arm 531 of the pouch actuator 532. When the actuator 532 is operated lever 520 will be rotated in a counterclockwise direction so as to rock lever 501 in a clockwise direction, thereby causing a power actuation of the type bar 513 in the manner above described. Each of the various type bar control linkages of the typewriter is provided with a pouch actuator unit which is similar to that just described. These actuators may be supported and arranged in a manner similar to that described and shown in U.S. Patent 2,220,075.

The electric typewriter used in connection with the instant apparatus is provided with the usual ribbon color selector mechanism which will allow the typed characters to appear in either red or black color. To the shaft 536, Fig. 30, of the said ribbon mechanism is secured a crank arm 537 the outer end of which is connected by means of link 538 to the arm 539 of the bell crank 540. The bell crank 540 is pivotally mounted on a stud 542 secured to a bracket 543 that is fixedly mounted on the portion 544 of the machine frame. The depending arm 541 of the bell crank 540 is adapted to be rocked in either rotative direction by the arms 549 and 550 of the bellows actuators 551 and 552; said bellows being suitably secured, as at 553, to said frame portion 554. When the bellows actuator 551 is operated bell crank 540 will be rocked to its clockwise position shown in Fig. 30 wherein the type characters will appear in red color, the crank 540 being held in said position by the usual yieldable type detent device normally associated with the conventional ribbon color change linkage. When the bellows actuator 552 is operated the bell crank 540 will be rotated to and held in its counterclockwise position wherein the typed characters will appear in black color.

Figure 33:
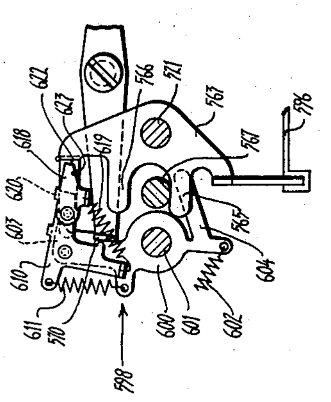
Figs. 32 and 33 are detailed side elevational views showing the two active conditions of a portion of the mechanism shown in Fig. 31.
Figure 32:
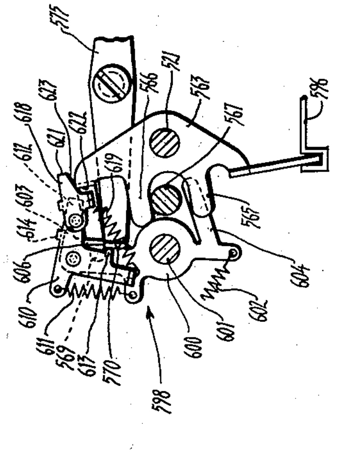
Figure 31:
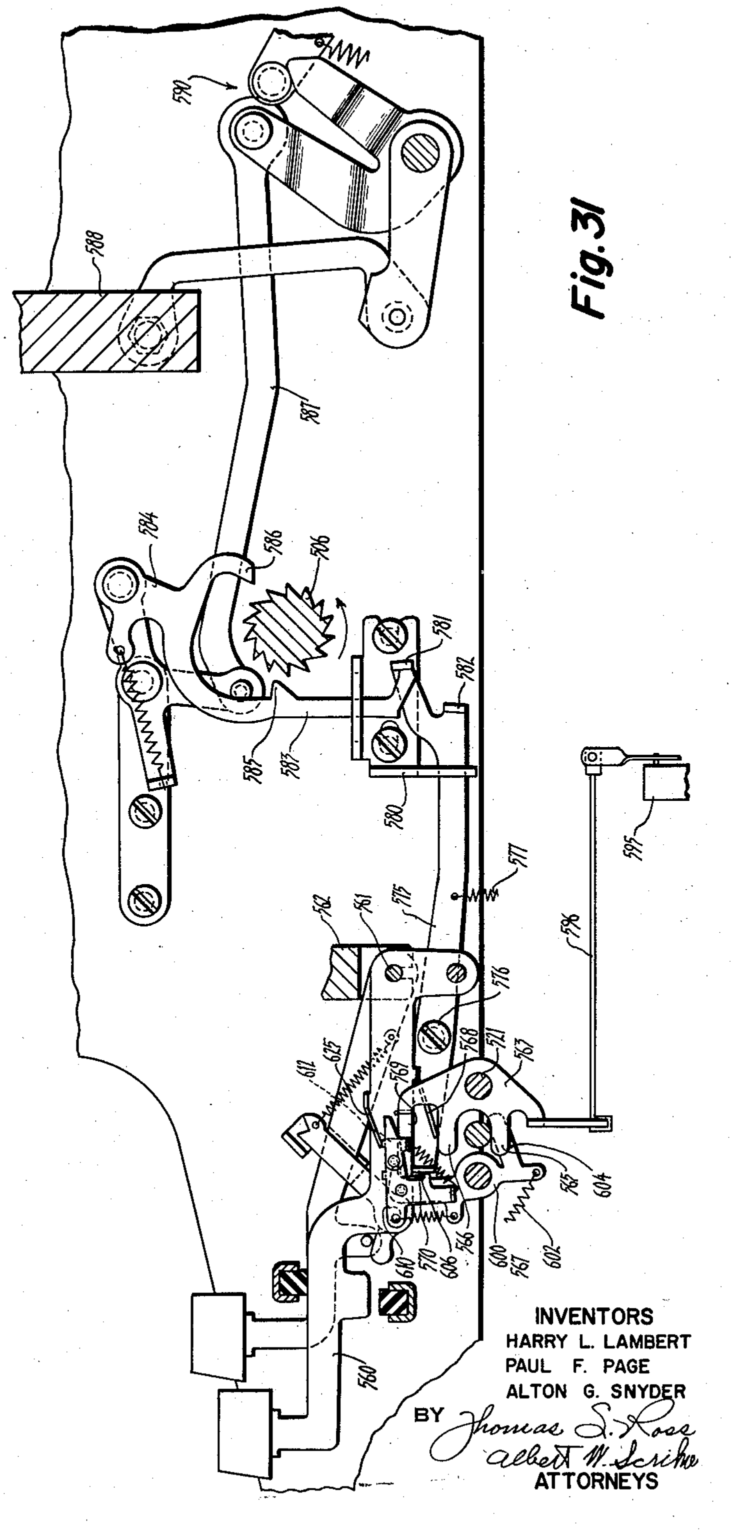
Fig. 31 is a side elevation of the case shift mechanism provided in the typewriter used with the instant apparatus.

Figs. 31–33 show the case shift mechanism which is used in the instant apparatus. The shift key lever 560 is pivotally mounted on a cross shaft 561 secured to the portion 562 of the machine frame and is adapted to rotatably actuate the lever 563 pivotally mounted on said cross shaft 521. Lever 563 has two forwardly projecting arms 565 and 566 which cooperate with the fixed cross shaft 567 so as to define the limits of rotational movement of said lever 563. The bent-off extension 568 formed on the lower edge of the key lever 560 overlies the upper edge of said arm 566 so that the downward movement of key lever 560 will serve to rotate lever 563 in a counterclockwise direction. The upper end of lever 563 is provided with a forward extension arm 569 the outer end of which overlies the bent-over ear 570, Figs. 30–32, of a control lever 575. Said control lever is pivotally mounted on a fixed stud 576 and is rotatably biased in a clockwise direction by a spring 577. The right hand end of lever 575 extends through a vertical slot in the stationary bracket 580 and is provided with a pair of bent-over ears 581 and 582 which are horizontally and vertically spaced from each other. Said ears 581 and 582 cooperate in a conventional manner with the depending portion 583 of the spring biased actuating arm 584. A pair of opposed teeth 585 and 586 formed on said arm 584 are adapted to sequentially engage the teeth of the said power driven roll 506, Fig. 30, so as to actuate the link 587 and thereby vertically shift the type bar supporting member or segment 588. The member 588 is yieldably retained in its upper or lower position by means of the detent mechanism generally indicated at 590. The machine parts numbered 582 through 590 are conventional in construction and operation and need not be further explained here. Suffice it to say that when the lever 575 is rotated to its clockwise position, the type bars of the machine will be shifted so as to permit the typing of lower case characters whereas when said lever 575 is rotated to its counterclockwise position, said type bars will be shifted in position so as to permit the typing of upper case characters. Said lever 575 may be rotatably actuated by said key lever 560 as above described or by the lever 563 which is actuated by the pouch actuator 595 through link 596.

A mechanism 598, Figs. 32 and 33, is provided for moving the lever 575 to its clockwise and counterclockwise positions as the lever 563 is successively oscillated in a counterclockwise direction by operation of the pouch actuator 595. This mechanism comprises a first lever 600 which is pivotally mounted on the stub shaft 601, Fig. 32, and which is biased in a clockwise direction by means of a spring 602. Said lever 600 is provided with an upper tip 603 and a lower extension arm 604 which underlies the said cross shaft 567; said arm 604 cooperating with shaft 567 so as to determine the limit of rotational movement of said lever 600 in a counterclockwise direction. The upper right hand edge of the lever 600 is formed with a shoulder 606 which is adapted to cooperate with the bent-over portion 570 of lever 575. Pivotally mounted on the upper end of the lever 600 is a lever 610 which is biased in a counterclockwise direction by means of spring 611. The lever 610 is provided with an upper arm 612, Fig. 32, and an intermediate lug 613 which extends from the depending portion of said lever 610. Said lug 613 is adapted to engage the said bent-over ear 570 of lever 575. The bent-over ear 614 at the top of lever 610 overlies the upper edge of the lever 600 and limits the extent of clockwise rotation of lever 610 relative to lever 600. A detent 618 is pivotally secured to the end of said upper arm 612 of lever 610 and is biased in a clockwise direction by means of a spring 619. The upper edge of said detent is provided with a bent-over ear 620, Fig. 33, which overlies the upper edge of lever 610 and which limits the extent of clockwise rotation of detent 618 relative to lever 610. The outer end 621 of said detent is adapted to cooperate with the offset shoulder portion 622 which integrally interconnects the said arm 569 and the main body portion of lever 563. A camming surface 623, Fig. 33, is formed on the lower edge of said detent 618.

In the normal condition of the parts the spring 577 will retain lever 575 in its clockwise position shown in Fig. 31 wherein the said bent-over ear 570 of lever 575 is out of engagement with and above the shoulder 606 of lever 600 and is in contact with the lower edge of the arm 569 of lever 563. Under these conditions the movable type bar supporting member 588 will be in a position to permit the typing of lower case characters. When the pouch actuator 595 is operated the said arm 569 of lever 563 and the bent-over ear 570 will move downwardly as shown in Fig. 32 to thereby rotate lever 575 to its counterclockwise position wherein the type bar supporting member 588 will be moved to and retained in a position to permit the typing of upper case characters. As the said bent-over ear 570 is lowered its upper edge will finally ride over the edge of shoulder 606 on lever 600, whereupon spring 602 will rotate lever 600 clockwise to a position wherein said shoulder 606 overlies said ear 570 thus preventing the lever 575 from returning to its normal clockwise position. During the above mentioned counterclockwise rotation of lever 563 the offset shoulder 622 thereof will engage the camming surface 623 of detent 618 thereby rotating said detent counterclockwise against the action of spring 619, Fig. 32. When the actuator 595 restores lever 563 to its normal position, Figs. 31 and 33, the said shoulder 622 of lever 563 will ride back over camming surface 623 whereafter said detent will be rotated to a clockwise position under the action of spring 619 so that the said end 621 of said detent lies immediately to the left of said offset shoulder 622 of the lever 563 as shown in Fig. 33.

When it is desired to type lower case instead of upper case characters the pouch actuator 595 is again operated to rotate the lever 563 in a counterclockwise direction. During this movement the shoulder 622 of the lever 563 will now engage the end 621 of the detent 618, Fig. 33, and will displace said detent, together with the levers 610 and 600, in a counterclockwise direction about the shaft 601 so as to move said shoulder 606 of lever 600 out of overlying relation with respect to the bent-over ear 570 of lever 575. Being thus freed the lever 575 will rotate in a clockwise direction to its normal position, Fig. 31, under the action of its spring 577 whereby the type bar supporting member 588 may be moved to and retained in a position to permit the typing of lower case characters. It will be seen that by successively operating the pouch actuator 595 the type bar supporting member 588 will be alternately moved to and retained in upper and lower case typing positions.

An offset finger 625 is formed along the top edge of the key lever 560, Fig. 31; the end of this finger being disposed in overlying relation to the detent 618. Hence, when the key lever 560 is manually operated to depress the ear 570 of lever 575, said finger will rotate the lever 610 and the detent 612 in a clockwise direction so that the tip 621, Fig. 32. of said detent will be engaged by the shoulder 622 of the counterclockwise rotating lever 563. Lever 600 will then be rotated in a counterclockwise direction thereby preventing the bent-over ear 570 of lever 575 from being latched beneath the shoulder 606 of said lever 600. Thus the presence of the mechanism 598, Fig. 32, does not interfere with the normal manual operation of the shift key lever 560.

Figures 34, 35:
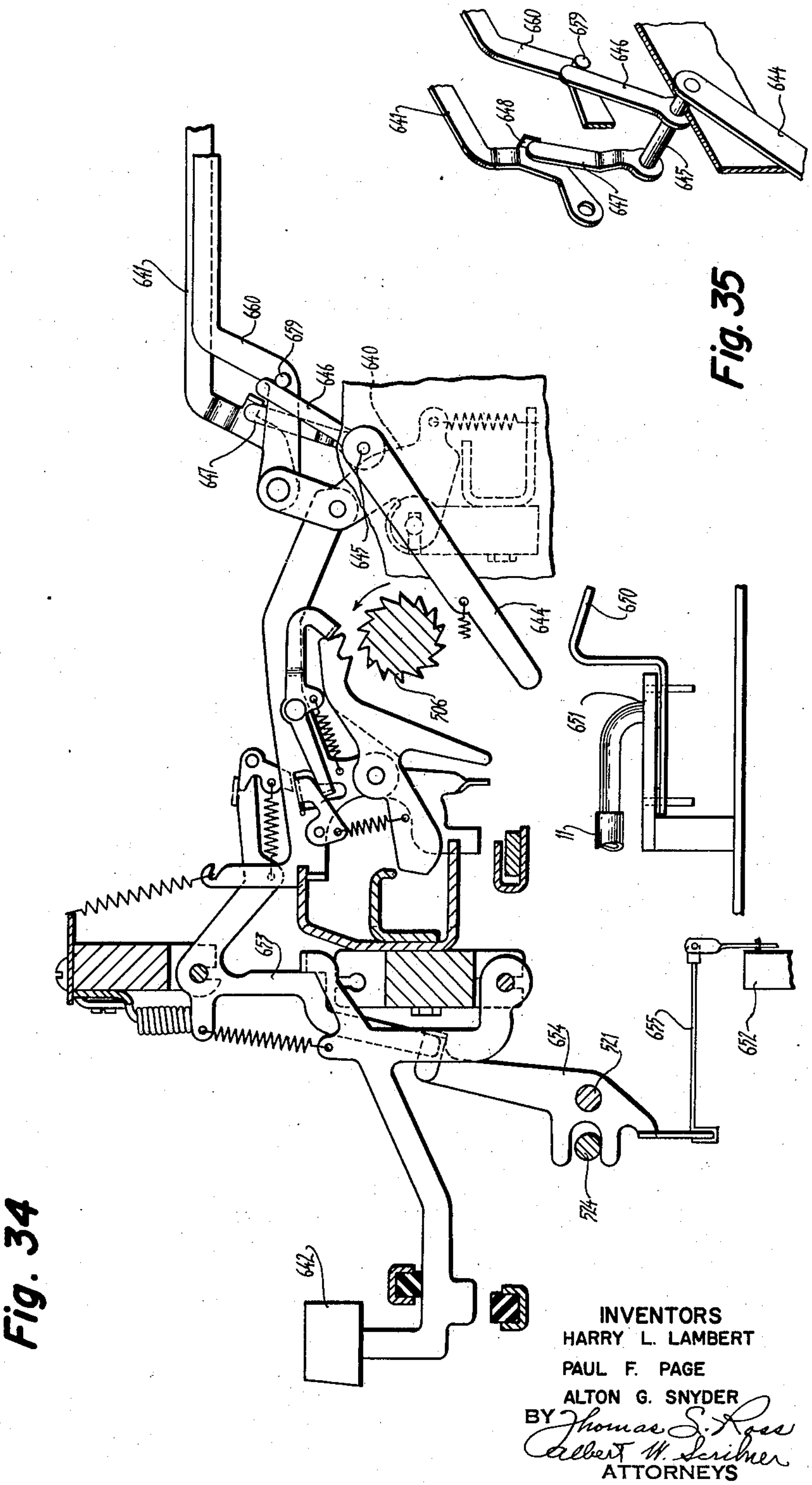
Figs. 34 and 35 are side elevational and perspective views respectively and each illustrates the linkages for controlling the return and tabulate movements of the typewriter carriage.

Fig. 34 shows the typewriter carriage return mechanism wherein the power actuated bell crank 640 is connected to a link 641 so that when the carriage return key 642 is depressed the link 641 will be moved to the left, as viewed in Fig. 34, to thereby engage the carriage return clutch of the typewriter. This conventional type of linkage is supplemented by means of an arm 644 which is rotatably secured to the fixed stub shaft 645, Figs. 34 and 35. Lever arms 646 and 647, Fig. 35, are also rotatably secured to the said shaft 645; the upper end of the arm 647 lying in front of and cooperating with the bent-over ear 648 formed on the said clutch control link 641. When the bell crank 640 is actuated the outer end of arm 644 will be moved downwardly so as to engage and depress the arm 650 of the impulse valve 651. The pouch actuator 652 for operating the carriage return control linkage is adapted to rotatably operate the lever 653 through the lever 654 and link 655 which are respectively similar in construction and operation to that shown at 532, 501, 520 and 630 in Fig. 30. In that the arm 644 remains in its counterclockwise actuated position during the entire period required for the typewriter carriage return movement, it will be apparent that atmospheric pressure will exist in the output line 11 of said impulse valve 651 during the said period.

The instant typewriter is provided with a conventional type key operated carriage tabulation control linkage which is similar to the linkage illustrated in Fig. 34 and which when operated is also capable of rotatably actuating the said arm 644. As shown in Fig. 35 the upper end of said lever arm 646 lies immediately in front of the pin 659 which is secured to the conventional type tabulate control link 660. Link 660 is power actuated in a manner similar to that described for said link 641. Thus when either the "carriage return" or "tabulate" control linkages of the instant typewriter are actuated the arm 644 will rotate counterclockwise to actuate the arm 650 of the impulse valve 651.

Figs. 36 and 37 collectively define the circuit diagram for the instant apparatus. The major valve assemblies; namely the reading head 3, Fig. 1, the primary-secondary valve assembly 4, the decoding valve assembly 5, the actuator assembly 6 and the clutch control 1A for the tape feed mechanism 1, are generally designated by either solid or dotted lined rectangles. The symbol S appearing in the upper left hand corner of any of said rectangles indicates that the various valves of that assembly communicate in the usual manner with a subatmospheric pressure source. Referring to Fig. 36 the six ports R1 through R6 (see Fig. 26) of the reading head 3 respectively communicate with the output lines 670 through 675. Said output lines correspond to the six lines 464 and 466 described above in connection with Figs. 27 and 28. Lines 670–675 are respectively connected so as to control one of the six primary-secondary valve units P–S1 through P–S6 of the primary-secondary valve assembly 4. A seventh output line 9, Figs. 1, 26 and 36, pneumatically communicating with the port R7 of the reading head 3, is operatively connected to the tape feed clutch control 1A, Fig. 37, in a manner described below.

In that all of said primary-secondary valve units P–S1 through P–S6 are identical a discussion of one thereof, P–S1, will suffice here. As shown in Fig. 35 the line 670 constitutes a common control line for both the secondary valve 678 and the primary valve 679 of the primary-secondary valve unit P–S1. The output lines from said secondary and primary valves are designated by arrows 1S and 1P respectively. It will be apparent that the pressures in the output lines 1P and 1S are normally subatmospheric and atmospheric respectively and that when an atmospheric pressure impulse is initiated in the control line 670, these pressure conditions will be respectively reversed. The output lines for the valve units P–S2 through P–S6, corresponding to said lines 1P and 1S, have been designated as 2P, 2S; 3P, 3S; 4P, 4S; 5P, 5S; and 6P and 6S respectively. The twelve output lines from the primary-secondary valve unit 4 are respectively connected so as to control one or more of the various blocking valves of the decoding valve assembly 5. The flow lines of said blocking valves are interconnected in series and/or parallel functional relation in the pattern shown in Fig. 36. Here, each of said blocking valves is numbered the same as the line which controls it; said control lines being omitted from the circuit diagram for the sake of clarity. For example, all the blocking valves numbered 6P are controlled by the said primary-secondary valve output line 6P; similarly, all the blocking valves which are designated as 2S are controlled by said line 2S of the valve assembly 4.

It will be seen that due to the above described normal pressure conditions in the respective output lines of the primary-secondary valve units P–S1 through P–S6 all the blocking valves of the decoder 5 which are controlled by the pressure conduit lines 1P, 2P, 3P, 4P, 5P, and 6P will be normally open while all the blocking valves controlled by lines 1S, 2S, 3S, 4S, 5S and 6S will be normally closed. Thus as the various primary-secondary valve units P–S1 through P–S6 are operated either singly or in combination, the respective associated blocking valves of the decoding assembly 5 will be correspondingly opened or closed. Each time the decoding valve assembly 5 receives a group of pressure impulses from valve assembly 4, said decoder assembly will be thereby operated so as to pneumatically connect one of the decoder air inlet lines 680 or 681 with one, and only one, of the various output lines 682 of the decoder assembly. In the normal condition of the decoder 5 none of the output lines 682 are pneumatically connected to said air inlet lines 680 and 681.

With certain exceptions to be noted, each of the output lines 682 from the decoding assembly 5 is connected so as to operate either one of the pouch actuators 532, Fig. 30, for the type bar control linkages of the typewriter, or one of the pouch actuators 595, 652, etc. Figs. 31, 34, for the function control linkages of the typewriter, such connection being illustrated at 684 and 685 of the circuit diagram. The particular character or function control key of the typewriter with which each of the various decoder output lines 682 is associated is listed adjacent the respective ends of said output lines. Any of the lines 682 which are not needed or required for the operation of the particular typewriter used in the system may be plugged or otherwise blocked as indicated at 683.

The decoder output lines marked "black ribbon" and "red ribbon" are connected through lines 686 and 687 so as to control the secondary valves 689 and 690 which in turn respectively control the operation of the bellow actuators 551 and 552. Operation of the actuators 551, 552 actuates the lever 541 of the typewriter ribbon shift mechanism as describe above in connection with Figure 30.

The clutch control circuitry for the tape feed mechanism 1 of Figs. 1 and 18 is shown in Fig. 37. Here the pouch actuators 425, 426 and 427 and bellows actuators 330 and 331 of the tape feed clutch control mechanism correspond to the actuators shown and described in connection with Fig. 18. Operation of the rewind bellows actuator 330 is controlled by the output line 692 of the on-off valve 693. The "on" control line 694 of valve 693 is connected to and controlled by both the output line 695 of the manually operated impulse valve 696 of the control panel 8, and the "rewind" output line of the decoding valve assembly 5, through line 697. The "off" control line 9 for valve 693 is directly connected to and controlled by the tape reading head 3 and communicates with said reader port R7. Operation of the skip-forward bellows actuator 331 is controlled by the output line 700 of the secondary valve 701 which has a control line 702 that is connected to and controlled by the manually operated impulse valve 703 of said panel 8. The permanent start actuator 425 of the tape feed clutch control 1A is controlled by the output line 710 of the manually operated impulse valve 711 of said panel. The permanent stop actuator 426 is controlled through line 712 either by the output line 713 of the panel impulse valve 714 or by the line 715 which is connected to and controlled by the "stop code" output line of the decoder 5.

It is apparent that when the control tape is being driven at a rapid rate during a skip-forward or rewind operation, the clutch 238 should be disabled so that no pneumatic sensing of the punched tape may occur. To accomplish this the output line 717 of the impulse valve 372 is connected to the line 718 which controls the operation of the temporary stop actuator 427. Likewise the said tape feed mechanism should be disabled during the "return" and "tabulator" movements of the typewriter carriage, hence the control line 718 for said temporary stop actuator 427 is connected to the output line 11, Figs. 1 and 37, of the impulse valve 651 described above in connection with Fig. 34. When either impulse valve 651 or 372 is operated the clutch 238 will be placed in the disengaged condition shown in Figs. 23 and 25 whereby the valve 471 is held by link 297, Fig. 26, in the closed position of Fig. 28. Thus during the various carriage control functions and high speed tape movements the "read" speed tape feed drive is interrupted and the pneumatic sensing head 3 is simultaneously disabled.

In that a considerable time delay is possible between the initiation of a pressure impulse in either the "carriage return" or "tabulator" output lines of the decoder 5 and the responsive actuation of the tape feed temporary stop actuator 427, the tape feed mechanism may continue to operate during the initial portion of said carriage movements thereby causing one or more of the type bars to be actuated. Such an occurrence during said carriage movement is obviously undesirable and to overcome this possibility an additional circuit 720 of blocking valves is provided at one end of the decoder assembly 5. The blocking valves in this circuit are controlled by the primary-secondary valve assembly 4 and are numbered in accordance with the system described above for the other blocking valves of the decoder 5. The pattern of distribution and interconnection between the blocking valves of circuit 720, as shown in Fig. 36, is such that whenever an atmospheric pressure impulse is initiated in either the carriage return, tabulate or shift output lines of the decoder 5, an atmospheric pressure impulse is simultaneously initiated in the output line 10, Figs. 1 and 37, of said circuit. In that line 10 is connected directly to the temporary stop actuator 427 through lines 722 and 718, it will be apparent that any pressure impulse initiated in the line 10 will immediately operate the tape feed temporary stop actuator 427. The duration of this "booster" impulse is only momentary and need only be as long as the time it takes for the corresponding pressure impulse from one of the said three decoder output lines to effectively initiate a signal in the output line 11 of the impulse valve 651, Figs. 34 and 37. Being thus able to immediately stop the tape feed mechanism 1 no type bars will be actuated during the return and tabulate movement of the typewriter carriage. It will be noted that an atmospheric pressure impulse is initiated in the said output line 10 of circuit 720 when an impulse occurs in the "shift" output line of the decoder 5. This feature is desirable in that a momentary interruption of the tape feed will occur when the typewriter shift mechanism of Fig. 31 is actuated and such will insure that the pneumatic sensing and the typing of the next character will not occur before said type bar case shift movement has been completed.

A safety feature is provided so that none of the type bars will be actuated when the power supply switch of the instant electric typewriter has been turned off. Here an impulse valve 724, Fig. 37, is pneumatically connected through line 725 to the control line 718 of the temporary clutch stop, the operating arm of said valve 724 being mechanically controlled in any suitable manner by the operation of the movable element of said power supply switch. As will be evident here, when the said power supply switch is in the "off" position the impulse valve 724 will be held in the actuated condition thereby insuring that the temporary stop pouch actuator 427 maintains the clutch 238, Fig. 23, in the disengaged condition.

A general review of the operation of the instant apparatus will now be made. It will be assumed that the motors for operating the electric typewriter and the usual sub-atmospheric pressure pump are running, that the motor shaft 224, Fig. 18, is being rotatably driven at a constant speed, and that the typewriter 7 which is to be used in the above described combination has been properly adjusted, i.e. the desired margin and the "tab" stops have been set and the paper to be typed on has been appropriately positioned in the machine carriage.

The tape reels 203 and 214 are lowered onto their respective supporting spools, Fig. 18, and a short length of the record tape 2, after being unwound from the storage reel 214, is extended over the sensing head 3 and then secured to and wound onto the take-up reel 203. If a considerable length of the tape 2 must be passed over the head 3 before any coded punched holes therein are to be encountered, the "skip-forward" impulse valve of the control panel 8 is actuated to rapidly transfer at least a portion of said initial unused length of tape onto the take-up reel 203. Thereafter the "start" impulse valve of the panel 8 is operated whereby clutch 238, Fig. 23, is engaged and the punched tape is intermittently fed at "read" speeds over said head 3. As each successive transverse row of coded punched holes is pneumatically sensed or read the corresponding character keys of the typewriter 7 will be automatically and successively actuated to thereby type a series of letters which correspond to those encoded on the sensed portion of the punched tape 2. The sensing and feeding of the tape 2 will be frequently interrupted by the operation of the temporary stop actuator 427 which prevents the actuation of the type bars of the typewriter during the various case shift, carriage return and carriage tabulate operations which are required in the typing of invoices, letters etc. The tape reading operations may be respectively stopped and restarted at any time by operating the "stop" and "start" impulse valves of the panel 8.

The last transverse row of holes in the tape usually calls for a tape rewind operation, hence after the reading and typing operations have been completed the bellows actuator 330 will be operated to engage the rewind drive wheels 321, 322 with the periphery of the tape reel 214. At this time the clutches 238, 271 and 284, will be disengaged and the valve stem 471 will be retained in its said closed position; thus the tape 2 is rapidly rewound onto reel 214 until a predetermined rewind stop hole in the tape passes over the port R7 of the reading head 3. In that moving the valve stem 471 to its closed position does not disconnect the port R7 from its associated output line, Figs. 1, 26 and 36, said rewind stop hole will initiate an atmospheric pressure impulse in the line 9 to thereby switch the valve 693 to its "off" condition, thus discontinuing the operation of the rewind bellows actuator 330. The rewinding of the tape 2 will thereby stop and the lever 350 will be lowered closing the impulse valve 372 and reengaging the tape drive clutch 238. The tape 2 will then be fed from left to right, Fig. 18, over the head 2 until the first transverse row of coded holes is sensed. In that this first row of holes normally calls for a "stop code," the clutch 238 will be disengaged by operation of the pouch actuator 426 and the tape feed will be stopped. Thereafter a new sheet of paper may be inserted into the typewriter 7 preparatory for a repeat reading of the tape 2 or for a removal of said tape reels and the insertion of a new set of reels.

While there is in this application specifically described one form which the invention may assume in practice, it will be understood that this form of the same is shown for purposes of illustration only and that the invention may be modified and embodied in various other forms without departing from its spirit or the scope of the appended claims.

The invention claimed is:

1. Automatic apparatus for operating the control linkages of a business machine in accordance with the coded pattern of distribution of holes in each of a plurality of transverse rows of holes punched in a record tape; comprising, a reading head, means for intermittently feeding said record tape over said reading head, valve means operated in timed relation to said tape feeding means for periodically enabling said reading head to sense said record tape and to initiate successive groups of coded pneumatic pressure impulses in accordance with the respective coded distributions of holes in said rows, means for decoding said impulses and for initiating a plurality of pneumatic pressure impulses which respectively correspond to the various individual control linkages of said machine, and means controlled by said last mentioned means for respectively actuating said linkages.

2. Pneumatic apparatus for automatically operating the respective type bar linkages of a typewriter under the control of a record tape having a plurality of groups of punched holes, the holes in each of said groups being distributed in accordance with a particular code pattern; comprising, cyclically operated valve means for initiating coded pneumatic pressure impulses in accordance with the number and location of the holes in each of said groups, means for decoding said pneumatic impulses, and actuator means for controlling the selective actuation of the various type bar linkages of said typewriter in response to the successive operation of said decoding means.

3. Pneumatic apparatus for operating the type bar control linkages of a typewriter under the control of record tape having a plurality of successive transverse rows of holes, the holes in each of said rows being distributed in accordance with standard communication code; comprising, a reading head, means for intermittently feeding said record tape over said reading head, means for initiating a plurality of pneumatic pressure impulses which correspond to the coded pattern of distribution of said holes in said respective rows, means disabling said reading head during the operation of said tape feeding means, means for decoding said impulses including a plurality of blocking valves functionally interconnected in series and parallel relationship, and means selectively operated by said decoding means for actuating the said type bar control linkages.

4. Pneumatic apparatus for automatically operating an electric typewriter under the control of a record tape having a plurality of successive transverse rows of holes, the holes in each of said rows distributed in accordance with communication code, said typewriter having a plurality of linkages for controlling the actuation of the type bars and carriage of said typewriter; comprising, a reading head for initiating a plurality of pressure impulses which correspond to the coded distribution of holes in each of said rows, a primary-secondary valve means for initiating a pair of pressure impulses in response to each of the impulses initiated by and received from said head, decoding means controlled by said valve means for initiating a succession of individual pressure impulses each of which corresponds to one of the keys of said typewriter, said decoding means having a plurality of blocking valves functionally arranged in series and parallel relationship, and actuating means controlled by said last mentioned impulses for selectively operating said linkages of the typewriter.

5. In a pneumatic apparatus for operating the type bar control linkages of an electric typewriter under the control of a record tape having a plurality of transverse rows of holes punched therein, the holes in each of said rows being distributed in accordance with a particular code pattern; the improvement comprising, a tape reading head having a row of aligned ports formed therein, a plurality of pressure conduit lines respectively communicating with said ports, drive means for intermittently feeding said tape over said ports, drive means for rapidly moving said tape over said reading head, means for normally maintaining a sub-atmospheric pressure in said lines whereby when a punched hole in the tape is moved into registry with any one of the said ports an atmospheric pressure impulse may be initiated in the associated one of said lines, means for pneumatically disabling and enabling said reading head in timed relation to the operation of said tape feeding drive means, decoding means successively operated by related groups of pressure impulses received from said head through said lines for initiating a succession of individual pressure impulses, actuating means controlled by said individual pressure impulses for successively operating the said type bar control linkages, and means for disabling said tape feeding means in response to a carriage return operation of said typewriter.

6. Pneumatic apparatus for operating the type bar and the carriage control linkages of an electric typewriter; comprising, a reading head for pneumatically sensing a punched tape that has a plurality of successive transverse rows of holes, the holes in each of said rows being distributed in accordance with a particular code pattern, drive means for feeding said tape over said reading head, means for initiating a plurality of coded pneumatic pressure impulses which correspond to the distribution of the holes in the row being sensed, decoding means controlled by said last mentioned means, actuating means controlled by said decoding means for operating the type bar and carriage control linkages of said typewriter, and means for disabling said drive means during the operation of said carriage control linkages.

7. Pneumatic apparatus for operating an electric typewriter having a plurality of selectively operable linkages for controlling the actuation of the respective typewriter type bars, and three selectively operable linkages for respectively controlling the tabulator and carriage return movements of the carriage and the shift movement of the type bar supporting segment; comprising, a reading head for pneumatically sensing the distribution of holes in each of a plurality of successive transverse rows of coded holes punched in a control tape and for initiating a plurality of coded pressure impulses which correspond to the pattern of distribution of said holes, drive means for feeding said tape over said reading head, valve means for decoding said impulses and initiating a plurality of successive individual pressure impulses, actuator means controlled by some of said individual pressure impulses for actuating said type bar control linkages, means controlled by others of said individual impulses for selectively actuating the three of said control linkages, and means controlled by said last mentioned means for disabling said drive means.

8. Pneumatic apparatus for operating an electric typewriter having a plurality of selectively operable linkages for controlling the actuation of the respective typewriter type bars; comprising, a reading head for pneumatically sensing the coded distribution of the holes in each of a plurality of transverse rows of holes punched in a record tape, drive means for intermittently feeding said tape over said reading head at read speeds, drive means for rapidly moving said tape over said head in skip-forward and rewind operations, pneumatic means responsive to the operation of said head for initiating a plurality of pressure impulses which correspond to the coded pattern of distribution of the holes in said rows, decoding means actuated by said impulses, means controlled by the operation of said decoding means for selectively actuating said type bar control linkages, means responsive to the operation of one of said drive means for disabling the other of said drive means, a power supply switch for said typewriter, and means adapted to be operated by said switch for disabling said intermittent tape feeding means.

9. Pneumatic apparatus for automatically operating the type bar and carriage control linkages on an electric typewriter under the control of a record tape having a plurality of transverse rows of holes punched therein, the holes in each of said rows being distributed in accordance with standard communication code; comprising, a reading head for successively pneumatically sensing the distribution of holes in each of said rows, a first drive means for feeding said tape over said head at read speeds, a second drive means for moving said tape over said head at relatively rapid speeds, means controlled by said reading head for initiating a succession of individual pressure impulses, means controlled by some of said individual impulses for selectively actuating the type bar linkages of said typewriter, means controlled by other of said individual pressure impulses for selectively actuating the carriage control linkages of said typewriter, means controlled by said last mentioned means for disabling said first drive means, and means controlled by the operation of said second drive means for disabling said first drive means.

10. Pneumatic apparatus for automatically operating the control linkages of an electric typewriter under the control of a perforated record; comprising, a reading head for initiating a plurality of pneumatic pressure impulses in accordance with the distribution of perforations in said record, means for intermittently feeding said record over said head, means for pneumatically conditioning and disabling said reading head in timed relation to the intermittent feed of said record, decoding means operated by said impulses, and pneumatic actuators respectively controlled by said decoding means for selectively operating said control linkages.

11. Pneumatic apparatus for automatically operating the control linkages of an electric typewriter under the control of a record tape having a plurality of transverse rows of holes punched therein the holes in each of said rows being distributed in accordance with a particular code pattern; comprising, a reading head for initiating coded pneumatic pressure impulses in accordance with the coded distribution of holes in each of said rows, decoding means operated by said impulses, pneumatic actuators controlled by said decoding means for selectively actuating the control linkages of said typewriter, drive means for intermittently feeding said tape over said reading head, and means operated in timed relation to said drive means for successively conditioning said head for a record reading operation.

12. In a pneumatic apparatus for automatically operating an electric typewriter under the control of a perforated record; a reading head for initiating a plurality of successive groups of pneumatic pressure impulses, a plurality of pneumatic actuators each respectively controlled by one of the groups of said impulses and each adapted to operate a different one of the various control linkages of said typewriter, a first drive means for intermittently feeding said record over said head, a second drive means for moving said record over said head at relatively rapid speeds, means operated in timed relation to said first drive means for successively pneumatically conditioning said head for a record reading operation, and means operated by the actuation of said second drive means for controlling the pneumatic disabling of said reading head.

13. Pneumatic apparatus for automatically operating the type bar and carriage control linkages on an electric typewriter under the control of a record tape having a plurality of transverse rows of holes punched therein, the holes in each of said rows being distributed in accordance with standard communication code; comprising, a reading head for successively pneumatically sensing the distribution of holes in each said rows, a first drive means for feeding said tape over said head at read speeds, a second drive means for moving said tape over said head at relatively rapid speeds, decoding means controlled by said reading head for initiating a succession of individual pressure impulses, means controlled by some of said individual impulses for selectively actuating the type bar linkages of said typewriter, means controlled by other of said individual pressure impulses for selectively actuating the carriage control linkages of said typewriter, means controlled by said last mentioned means for disabling said first drive means, and means operated in timed relation to said first drive means for successively conditioning said head for a record reading operation.

14. Apparatus as defined by claim 13, and additionally comprising, means operated by the actuation of said second drive means for controlling the pneumatic disabling of said record reading head.

15. In a pneumatically operated perforated record reader, a reading head having a plurality of open ended bores formed therein, a sub-atmospheric pressure source, a plurality of output lines connected to said head, and valve means operable to alternately pneumatically connect said output lines with said pressure source and said bores.

16. In a pneumatically operated punched tape reader, a reading head having a plurality of open ended bores formed therein, a plurality of pressure conduit lines connected to said head, each of said lines being respectively associated with one of said bores, valve means movably mounted in said head and operable to selectively pneumatically connect and disconnect said lines and the open ends of said bores, and a sub-atmospheric pressure line connected to said head so as to be pneumatically connectable to said lines.

17. In a pneumatically operated punched tape reader, a reading head having a plurality of open ended bores formed therein, a plurality of output lines connected to said head, each of said lines being associated with one of said bores, a sub-atmospheric pressure line connected to said head, and valve means pivotally mounted in said head for movement to two rotative positions; said valve means in one of said positions pneumatically connecting said output lines to the respective open ends of said bores, and in the other of said positions pneumatically connecting said output lines to said sub-atmospheric pressure line.

18. In a punched tape reader having a main frame, at least one tape reel rotatably mounted on said frame, a reading head secured to said frame, valve means for pneumatically conditioning and disabling said head for tape sensing operations, and drive means for feeding a punched tape over the operative surface of said reading head; said means comprising, a tape feed sprocket drum rotatably mounted on said frame, means for rotatably driving said sprocket drum, and means responsive to the rotation of said sprocket drum for frictionally engaging and driving the periphery of said reel.

19. Apparatus as defined by claim 18 wherein said drive means intermittently rotates said sprocket drum and is connected to operate said valve means.

20. In a pneumatically operated punched tape reader, a main frame, at least one tape reel rotatably mounted on said frame, a reading head secured to said frame, a movable valve means for pneumatically conditioning and disabling said head for tape sensing operations, a tape feed sprocket drum rotatably mounted on said frame, drive means for rotating said drum, means responsive to the rotation of said drum for driving said reel, and means operated by said sprocket drum drive means for operating said valve means.

21. Apparatus as defined by claim 20 wherein said drive means intermittently rotates said sprocket drum.

22. In a pneumatically operated punched tape reader, a main frame, a reading head secured to said frame, said head having a plurality of open ended bores formed therein, a plurality of output lines connected to said head, valve means movably mounted in said head and adapted to be moved to two operative positions, one of said positions pneumatically connecting said lines with the respective open ends of said bores and the other of said positions disconnecting said lines from the open ends of said bores, at least one tape reel rotatably mounted on said frame, a tape feed sprocket drum rotatably mounted on said frame, drive means including a first clutch for intermittently rotating said drum, means operated by and in timed relation to said drive means for moving said valve means, and means actuated by the rotation of said sprocket drum for driving said tape reel.

23. Apparatus as defined by claim 22, additionally comprising a second clutch operatively disposed in said tape reel drive means, and means for respectively simultaneously engaging and disengaging said clutches.

24. Apparatus as defined by claim 22, additionally comprising, means for operatively engaging and disengaging said first clutch, and means responsive to the disengaging of said first clutch for locking said valve means in said other position.

25. Apparatus as defined by claim 24, additionally comprising, a second clutch operatively disposed in said tape reel drive means, and means for simultaneously disengaging both of said clutches.

26. In a pneumatic punched tape reader, a main frame, a reading head secured to said frame and having a plurality of open ended bores formed therein, at least one tape reel rotatably mounted on said frame, a tape feed sprocket drum rotatably mounted on said frame, drive means for said drum comprising, a first driven shaft rotatably mounted in said frame, a first gear eccentrically mounted on said shaft, a second gear meshing with said first gear and adapted to rotate about its own geometric axis and to planetate about the geometric axis of said first gear, a second shaft rotatably mounted in said frame, a third gear secured to said second shaft and meshing with said second gear, said second gear also being adapted to planetate about the axis of said third gear, and means operatively interconnecting said second shaft and said sprocket drum.

27. Apparatus as defined by claim 26, additionally comprising, means operated by said second shaft for rotatably driving said reel.

28. In a punched tape reader, a main frame, a reading head secured to said frame, a pair of tape reels rotatably mounted in said frame, drive means for feeding a punched tape from one of said reels over said head and onto the other of said reels, a clutch mechanism in said drive means, means for permanently engaging said clutch, means for permanently disengaging said clutch, means for temporarily disengaging said clutch, and power operated means for selectively actuating the last three mentioned means.

29. In a pneumatically operated tape reading apparatus, a main frame, a pneumatic sensing head secured to said frame, a pair of tape reels rotatably mounted on said frame, a first drive means for moving a punched tape over said head at read speeds, a second drive means for moving said tape over said head at rapid speeds, a clutch in said first drive means, a first control means for permanently engaging said clutch, a second control means for permanently disengaging said clutch, a third control means for temporarily disengaging said clutch, and means for operating said third control means in response to the operation of said second drive means.

30. Apparatus as defined by claim 29, additionally comprising, means for pneumatically disabling said reading head in response to the disengagement of said clutch.

31. In a pneumatic apparatus for controlling the automatic operation of the key actuated linkages of an electric typewriter; a reading head adapted to pneumatically sense a coded punched tape, a plurality of output pressure conduit lines connected to said reading head, means for feeding a coded punched tape over said head, a plurality of primary-secondary valve units each respectively connected to and controlled by one of said conduit lines, a plurality of blocking valves respectively controlled by said primary-secondary valve units, the flow lines of said blocking valves being interconnected in a predetermined decoding pattern, and a plurality of pneumatic actuators respectively and individually controlled by the flow lines of predetermined groups of said blocking valves for actuating said linkages.

References Cited in the file of this patent

UNITED STATES PATENTS

| | | |
|---|---|---|
| 2,247,275 | Buckley | June 24, 1941 |
| 2,292,701 | Kloid | Aug. 11, 1942 |

FOREIGN PATENTS

| | | |
|---|---|---|
| 380,639 | Germany | Sept. 8, 1923 |